(12) United States Patent
Wang et al.

(10) Patent No.: US 11,539,326 B2
(45) Date of Patent: Dec. 27, 2022

(54) PHOTOVOLTAIC DIRECT-CURRENT BREAKING APPARATUS

(71) Applicant: Huawei Technologies Co., Ltd., Guangdong (CN)

(72) Inventors: Xun Wang, Shanghai (CN); Yanzhong Zhang, Shanghai (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 39 days.

(21) Appl. No.: 17/359,011

(22) Filed: Jun. 25, 2021

(65) Prior Publication Data

US 2021/0328546 A1 Oct. 21, 2021

Related U.S. Application Data

(63) Continuation of application No. PCT/CN2018/124961, filed on Dec. 28, 2018.

(51) Int. Cl.
*H02S 40/36* (2014.01)
*H02H 5/06* (2006.01)
(Continued)

(52) U.S. Cl.
CPC .............. *H02S 40/36* (2014.12); *H01C 10/50* (2013.01); *H01H 33/596* (2013.01); *H02H 5/00* (2013.01)

(58) Field of Classification Search
CPC .......... H02S 40/36; H01C 10/50; H02H 5/06; H01H 33/596
See application file for complete search history.

(56) References Cited

U.S. PATENT DOCUMENTS

| 10,707,029 B2* | 7/2020 | Askan ................. H02H 3/025 |
| 2012/0175961 A1* | 7/2012 | Har-Shai .......... H01L 31/02021 |
| | | 307/80 |

(Continued)

FOREIGN PATENT DOCUMENTS

| CN | 104143809 A | 11/2014 |
| CN | 204696640 U | 10/2015 |

(Continued)

OTHER PUBLICATIONS

H. Polman et al.,"Design of a bi-directional 600 V/6 kA ZVS hybrid DC switch using IGBTs",Conference Record of the 2001 IEEE Industry Applications Conference. 36th IAS Annual Meeting (Cat. No.01CH37248),Total 8 Pages.

*Primary Examiner* — Scott Bauer
(74) *Attorney, Agent, or Firm* — Womble Bond Dickinson (US) LLP

(57) ABSTRACT

This application discloses a photovoltaic direct-current breaking apparatus, including a positive connection terminal and a negative connection terminal for connecting a photovoltaic string and a photovoltaic energy converter, a first diode, a first switch, a convector circuit, and an energy absorption circuit, where the first switch, the convector circuit, and the energy absorption circuit are connected in parallel. The convector circuit can effectively avoid arc discharge and ablation generated when the first switch cuts off a direct-current circuit between the photovoltaic string and the photovoltaic energy converter. The first diode can effectively bypass energy stored by an energy storage device in the photovoltaic energy converter, helping reduce required specifications of a semiconductor device in the convector circuit. The energy absorption circuit can also effectively reduce required specifications of the semiconductor device and a varistor.

13 Claims, 21 Drawing Sheets

(51) Int. Cl.
  *H01C 10/50* (2006.01)
  *H02H 5/00* (2006.01)
  *H01H 33/59* (2006.01)

(56) References Cited

U.S. PATENT DOCUMENTS

| | | | | |
|---|---|---|---|---|
| 2014/0022683 | A1* | 1/2014 | Brasola | H02H 1/0007 |
| | | | | 361/91.2 |
| 2015/0214724 | A1* | 7/2015 | Skarby | H02H 3/20 |
| | | | | 361/91.5 |
| 2017/0302189 | A1* | 10/2017 | Jakob | H02M 1/088 |
| 2019/0013662 | A1* | 1/2019 | Norrga | H02H 3/021 |
| 2019/0081505 | A1* | 3/2019 | Akita | G01R 31/42 |
| 2019/0089148 | A1* | 3/2019 | Hopf | H02H 7/20 |
| 2019/0363200 | A1* | 11/2019 | Höft | H02S 50/00 |
| 2020/0106272 | A1* | 4/2020 | Yu | H02J 13/00034 |
| 2021/0218387 | A1* | 7/2021 | Krishnan | H03K 17/73 |

FOREIGN PATENT DOCUMENTS

| | | |
|---|---|---|
| CN | 206149209 U | 5/2017 |
| CN | 106877301 A | 6/2017 |
| CN | 107026577 A | 8/2017 |
| CN | 107611959 A | 1/2018 |
| CN | 207010216 U | 2/2018 |
| JP | 2012156043 A | 8/2012 |
| WO | 2014177874 A2 | 11/2014 |

* cited by examiner

PHOTOVOLTAIC DIRECT-CURRENT BREAKING APPARATUS

CROSS-REFERENCE TO RELATED APPLICATIONS

This application is a continuation of International Application No. PCT/CN2018/124961, filed on Dec. 28, 2018. The disclosure of the aforementioned application is hereby incorporated by reference in its entirety.

TECHNICAL FIELD

This application relates to the technical field of circuits, and specifically, to a photovoltaic direct-current breaking apparatus.

BACKGROUND

Currently, large-scale photovoltaic power plants are generally connected to photovoltaic energy converters, such as inverters, through photovoltaic components that are connected in series to form photovoltaic strings, so as to perform power conversion and generate electricity. Usually, a direct-current voltage of the photovoltaic string reaches hundreds of volts or thousands of volts. Because an electrical connection between the photovoltaic string and the photovoltaic energy converter needs to be reliably and quickly cut off when the photovoltaic energy converter fails or is maintained, a direct-current circuit breaker is usually used to cut off the electrical connection between the photovoltaic string and the photovoltaic energy converter nowadays. Because there is no zero-crossing point in direct current and a voltage is high, an electric arc is prone to occur during a cut-off process but hard to extinguish, and there is an electric arc ablation problem at a breaking contact point.

To resolve the problem of proneness to the electric arc during the cut-off of the direct-current circuit breaker, as shown in FIG. 1, the prior art proposes a breaking apparatus connecting in parallel a shunt circuit and a varistor at both ends of a switch S for cutting off the foregoing electrical connection. The shunt circuit uses a semiconductor design, for example, is implemented by connecting in series two insulated gate bipolar transistors (IGBT) Q1 and Q2. When the breaking apparatus needs to be turned on, the semiconductor transistors Q1 and Q2 are first turned on by using the shunt circuit to implement high-voltage turn-on. Because a conduction voltage drop of the transistors Q1 and Q2 is only about 1 V to 2 V, the switch S is pulled in at this time. Because a voltage across two ends of a direct-current contact point is equal to a conduction voltage drop of the shunt circuit and is only 1 V to 2 V, the switch S does not cause problems such as arc discharge and ablation of contact points when the switch S pulls in the contact points. When the breaking apparatus needs to be turned off, the switch S is first opened. Because the voltage across two ends of the direct-current contact point is equal to the conduction voltage drop of the shunt circuit and is only 1 V to 2 V, the switch S does not cause the problems such as arc discharge and ablation of the contact points when the switch S is opened. When a distance between the contact points of the switch S is large enough, the two IGBTs Q1 and Q2 are turned off to disconnect the breaking apparatus.

Due to impact of a parasitic inductor in a wire, a voltage spike is likely to occur during turn-off of the IGBTs and may damage the IGBTs. Therefore, a varistor X is connected in parallel at both ends of the IGBT to absorb the voltage spike when the IGBTs are turned off, to protect the IGBTs. The breaking apparatus uses the varistor X as an energy absorption device. A direct-current voltage of one photovoltaic string is usually hundreds of volts to thousands of volts. Using a breaking direct-current voltage of 1000 V-10 A as an example, the varistor needs to withstand a voltage greater than 1000 V, and a varistor with a voltage up to 1100 V needs to be selected according to general specifications, resulting in high costs. If impact of an inductor of the inverter in a DC/DC loop is not considered, and only a parasitic inductive impedance is considered, when the IGBTs are turned off, a varistor clamping voltage far exceeds 1500 V, and a withstanding voltage specification of greater than 1500 V needs to be selected for the IGBTs and diodes connected in parallel, resulting in higher costs. In some embodiments, an output voltage of the photovoltaic string is greatly affected by lighting. Once the output voltage of the photovoltaic string is higher than a withstand voltage range of the varistor, a varistor may be damaged, reducing reliability of the breaking apparatus.

SUMMARY

Embodiments of this application provide a photovoltaic direct-current breaking apparatus, which can break an electrical connection between a photovoltaic string and a photovoltaic energy converter reliably at low costs.

This application provides a photovoltaic direct-current breaking apparatus, including:

a first positive connection terminal, a first negative connection terminal, a second positive connection terminal, a second negative connection terminal, a first switch, a first diode, a convector circuit, and an energy absorption circuit.

The first positive connection terminal and the first negative connection terminal are configured to connect an output terminal of a first photovoltaic string, and the second positive connection terminal and the second negative connection terminal are configured to connect a photovoltaic energy converter.

The first switch, the convector circuit, and the energy absorption circuit are connected in parallel, and are connected between the first negative connection terminal and the second negative connection terminal, a cathode of the first diode is connected between the first positive connection terminal and the second positive connection terminal, and an anode of the first diode is connected between the second negative connection terminal and a parallel circuit of the first switch, the convector circuit, and the energy absorption circuit; or the first switch, the convector circuit, and the energy absorption circuit are connected in parallel between the first positive connection terminal and the second positive connection terminal, a cathode of the first diode is connected between the second positive connection terminal and a parallel circuit of the first switch, the convector circuit, and the energy absorption circuit, and an anode of the first diode is connected between the first negative connection terminal and the second negative connection terminal.

The convector circuit includes a first fully-controlled semiconductor device, a second fully-controlled semiconductor device, a second diode, and a third diode, where a cathode of the second diode is connected to an input terminal of the first fully-controlled semiconductor device, an anode of the second diode is connected to an output terminal of the first fully-controlled semiconductor device and an output terminal of the second fully-controlled semiconductor device, an anode of the third diode is connected to the output terminal of the second fully-controlled semiconductor device, and a cathode of the third diode is connected to an input terminal of the second fully-controlled semiconductor device.

The energy absorption circuit includes a gas discharge tube, a varistor, and a steady-state balance resistor, where the gas discharge tube is connected in parallel to the steady-state balance resistor, and then connected in series to the varistor.

The first switch may be any one or combination of a relay, a circuit breaker, a contactor, and an electromagnetic type mechanical switch.

The gas discharge tube G may be replaced by a transient suppression diode.

The first diode D1 to a fourth diode D4 may be the same type of diodes or different types of diodes.

The first photovoltaic string may include the photovoltaic components that are connected in series/parallel.

In some embodiments, when the first switch needs to be closed, the first fully-controlled semiconductor device and the second fully-controlled semiconductor device are controlled to be turned on, so that a voltage across two ends of the first switch is only about 1 V to 2 V. In this case, closing the first switch does not cause the first switch K1 to generate arc discharge and electric shock ablation, thereby extending a service life of the first switch. In some embodiments, when the first switch needs to be opened, the first switch is first controlled to be opened, so that a breaking voltage of the first switch is reduced to only 1 V to 2 V, equaling a conduction voltage drop of the semiconductor device of the convector circuit 10, thereby effectively avoiding the arc discharge and electric shock ablation, and effectively protecting the first switch K1. Exactly because the solutions of this application can effectively protect the first switch, a device with low-voltage switch specifications may be selected as the first switch, thereby reducing costs of the photovoltaic direct-current breaking apparatus. In some embodiments, when the first switch is opened, because energy stored in a wire parasitic inductor of a cable of the photovoltaic string and an inductor of a DC-to-DC circuit inside the photovoltaic energy converter needs to be released, in this embodiment of this application, the first diode is used to release the energy stored in the inductor of the DC-to-DC circuit inside the photovoltaic energy converter along a path from a bus capacitor to the first diode and then back to the inductor of the DC-to-DC circuit. This reduces energy absorbed by the energy absorption circuit in the photovoltaic direct-current breaking apparatus, reducing required design specifications of the energy absorption circuit.

In some embodiments, the photovoltaic direct-current breaking apparatus includes a second switch.

When the first switch, the convector circuit, and the energy absorption circuit are connected in parallel, and are connected between the first negative connection terminal and the second negative connection terminal, one end of the second switch is connected to the first negative connection terminal, and the other end of the second switch is connected to one end of the first switch, the cathode of the second diode, and one end of the gas discharge tube, or one end of the second switch is connected to the second negative connection terminal and the anode of the first diode, and the other end of the second switch is connected to one end of the first switch, the cathode of the third diode, and one end of the varistor.

In some embodiments, the second switch is opened after the first switch. In this case, the convector circuit is turned off, and the energy absorption circuit has a high impedance. When the second switch is opened, there is no voltage or current, and therefore a switch device with low-voltage specifications may be selected as the second switch to implement reliable breaking in compliance with safety regulations.

In some embodiments, the photovoltaic direct-current breaking apparatus includes a third switch. The third switch is connected between the first positive connection terminal and a connection point of the second positive connection terminal and the cathode of the first diode.

In some embodiments, the third switch is opened after the first switch. In this case, the convector circuit is turned off, and the energy absorption circuit has a high impedance. When the third switch is opened, there is no voltage or current, and therefore a switch device with low-voltage specifications may be selected as the third switch to implement reliable breaking in compliance with safety regulations.

In some embodiments, the photovoltaic direct-current breaking apparatus includes a fourth switch.

When the first switch, the convector circuit, and the energy absorption circuit are connected in parallel, and are connected between the first positive connection terminal and the second positive connection terminal, one end of the fourth switch is connected to the first positive connection terminal, and the other end of the fourth switch is connected to one end of the first switch, the cathode of the second diode, and one end of the gas discharge tube, or one end of the fourth switch is connected to the second positive connection terminal and the cathode of the first diode, and the other end of the fourth switch is connected to one end of the first switch, the cathode of the third diode, and one end of the varistor.

In some embodiments, the fourth switch is opened after the first switch. In this case, the convector circuit is turned off, and the energy absorption circuit has a high impedance. When the fourth switch is opened, there is no voltage or current, and therefore a switch device with low-voltage specifications may be selected as the fourth switch to implement reliable breaking in compliance with safety regulations.

In some embodiments, the photovoltaic direct-current breaking apparatus includes a fifth switch, where the fifth switch is connected between the first negative connection terminal and a connection point of the second negative connection terminal and the anode of the first diode.

In some embodiments, the fifth switch is opened after the first switch. In this case, the convector circuit is turned off, and the energy absorption circuit has a high impedance. When the fifth switch is opened, there is no voltage or current, and therefore a switch device with low-voltage specifications may be selected as the fifth switch to implement reliable breaking in compliance with safety regulations.

In some embodiments, the photovoltaic direct-current breaking apparatus includes a third positive connection terminal and a third negative connection terminal, where the third negative connection terminal is connected between the first negative connection terminal and the parallel circuit of the first switch, the convector circuit, and the energy absorption circuit; the third positive connection terminal is connected between the first positive connection terminal and the connection point of the second positive connection terminal and the cathode of the first diode; and the third positive connection terminal and the third negative connection terminal are configured to connect an input terminal of a second photovoltaic string.

In some embodiments, the photovoltaic direct-current breaking apparatus can control an electrical connection between a plurality of photovoltaic strings and the photovoltaic energy converter, thereby increasing utilization of the photovoltaic direct-current breaking apparatus.

In some embodiments, the photovoltaic direct-current breaking apparatus includes a sixth switch and a seventh switch.

One end of the sixth switch is connected to the first negative connection terminal, and the other end of the sixth switch is connected to one end of the first switch, the cathode of the second diode, and one end of the gas discharge tube.

One end of the seventh switch is connected to the third negative connection terminal, and the other end of the seventh switch is connected to one end of the first switch, the cathode of the second diode, and one end of the gas discharge tube.

In some embodiments, when the photovoltaic direct-current breaking apparatus controls an electrical connection between the plurality of photovoltaic strings and the photovoltaic energy converter, a switch device with low-voltage specifications may be selected to implement reliable breaking in compliance with safety regulations.

In some embodiments, the photovoltaic direct-current breaking apparatus includes an eighth switch and a ninth switch.

The eighth switch is connected between the first positive connection terminal and the connection point of the second positive connection terminal and the cathode of the first diode.

One end of the ninth switch is connected to the third positive connection terminal, and the other end of the ninth switch is connected to the third positive connection terminal and the connection point of the second positive connection terminal and the cathode of the first diode.

In some embodiments, when the photovoltaic direct-current breaking apparatus controls an electrical connection between the plurality of photovoltaic strings and the photovoltaic energy converter, a switch device with low-voltage specifications may be selected to implement reliable breaking in compliance with safety regulations.

In some embodiments, the photovoltaic direct-current breaking apparatus includes a tenth switch and an eleventh switch.

One end of the tenth switch is connected to the first positive connection terminal, and the other end of the tenth switch is connected to one end of the first switch, the cathode of the second diode, and one end of the gas discharge tube.

One end of the eleventh switch is connected to the third positive connection terminal, and the other end of the eleventh switch is connected to one end of the first switch, the cathode of the second diode, and one end of the gas discharge tube.

In some embodiments, when the photovoltaic direct-current breaking apparatus controls an electrical connection between the plurality of photovoltaic strings and the photovoltaic energy converter, a switch device with low-voltage specifications may be selected to implement reliable breaking in compliance with safety regulations.

In some embodiments, the photovoltaic direct-current breaking apparatus includes a twelfth switch and a thirteenth switch.

The twelfth switch is connected between the first negative connection terminal and a connection point of the second negative connection terminal and the cathode of the first diode.

One end of the thirteenth switch is connected to the third negative connection terminal, and the other end of the thirteenth switch is connected between the third negative connection terminal and a connection point of the second negative connection terminal and the anode of the first diode.

In some embodiments, when the photovoltaic direct-current breaking apparatus controls an electrical connection between the plurality of photovoltaic strings and the photovoltaic energy converter, a switch device with low-voltage specifications may be selected to implement reliable breaking in compliance with safety regulations.

In some embodiments, the photovoltaic direct-current breaking apparatus includes a fourth positive connection terminal, a fourth negative connection terminal, a fifth positive connection terminal, a fourteenth switch, and a fifteenth switch, where the fourth positive connection terminal and the fourth negative connection terminal are configured to connect an input terminal of a third photovoltaic string, and the fifth positive connection terminal is configured to connect the photovoltaic energy converter.

When the first switch, the convector circuit, and the energy absorption circuit are connected in parallel, and are connected between the first negative connection terminal and a connection point of the second negative connection terminal and the anode of the first diode, the fourth negative connection terminal is connected to one end of the first switch, the cathode of the second diode, and one end of the gas discharge tube; the fourteenth switch is connected between the first positive connection terminal and a connection point of the second positive connection terminal and the cathode of the first diode; and the fifteenth switch is connected between the fourth positive connection terminal and the fifth positive connection terminal.

In some embodiments, when the photovoltaic direct-current breaking apparatus controls an electrical connection between the plurality of photovoltaic strings and the photovoltaic energy converter, a switch device with low-voltage specifications may be selected to implement reliable breaking in compliance with safety regulations.

In some embodiments, the photovoltaic direct-current breaking apparatus includes a fourth diode, where a cathode of the fourth diode is connected between the fifteenth switch and the fifth positive connection terminal; and an anode of the fourth diode is connected between the second negative connection terminal and the parallel circuit of the first switch, the convector circuit, and the energy absorption circuit.

In some embodiments, the photovoltaic direct-current breaking apparatus includes a sixth positive connection terminal, a sixth negative connection terminal, a seventh negative connection terminal, a fourth diode, a sixteenth switch, and a seventeenth switch, where the sixth positive connection terminal and the sixth negative connection terminal are configured to connect an input terminal of a fourth photovoltaic string, the seventh negative connection terminal is configured to connect the photovoltaic energy converter, a cathode of the fourth diode is connected between the second positive connection terminal and the parallel circuit of the first switch, the convector circuit, and the energy absorption circuit, and an anode of the fourth diode is connected between one end of the seventeenth switch and the seventh negative connection terminal.

When the first switch, the convector circuit, and the energy absorption circuit are connected in parallel, and are connected between the first positive connection terminal and the second positive connection terminal, the sixth positive connection terminal is connected to one end of the first switch, the cathode of the second diode, and one end of the gas discharge tube; the sixteenth switch is connected between the first negative connection terminal and a connection point of the second negative connection terminal and the anode of the first diode; and the seventeenth switch is connected between the sixth negative connection terminal and a connection point of the seventh negative connection terminal and the anode of the fourth diode.

In some embodiments, when the photovoltaic direct-current breaking apparatus controls an electrical connection between the plurality of photovoltaic strings and the photovoltaic energy converter, a switch device with low-voltage specifications may be selected to implement reliable breaking in compliance with safety regulations.

In some embodiments, the first diode D1 to the fourth diode D4 may be the same type of diode or different types of diodes.

The first diode in the photovoltaic direct-current breaking apparatus provided in the embodiments of this application enables energy stored in the inductor of the direct current (DC)-to-direct current (DC) circuit inside the photovoltaic energy converter to be released along a path from the bus capacitor to the first diode and then back to the DC-to-DC circuit, thereby reducing energy absorbed by the energy absorption circuit in the photovoltaic direct-current breaking apparatus, and reducing required design specifications of the energy absorption circuit. In some embodiments, the energy absorption circuit of the photovoltaic direct-current breaking apparatus provided in the embodiments of this application includes the gas discharge tube, the varistor, and the steady-state balance resistor, where the gas discharge tube is connected in parallel to the steady-state balance resistor, and then connected in series to the varistor. Connecting the gas discharge in series to the varistor can increase a static withstand capability of the energy absorption circuit, reducing required specifications of the varistor. Connecting the gas discharge tube in series to the varistor can reduce an instantaneous clamping voltage upon turn-off of the IGBTs, thereby reducing required withstand voltage specifications of the IGBTs. This can reduce device costs and improve breaking reliability.

DESCRIPTION OF EMBODIMENTS

The following describes embodiments of this application with reference to the accompanying drawings. Apparently, the described embodiments are merely some but not all embodiments of this application. A person of ordinary skill in the art knows that with the development of technologies and the emergence of new scenarios, technical solutions provided in the embodiments of this application are also applicable to similar technical problems.

An embodiment of this application provides a photovoltaic direct-current breaking apparatus, which can break an electrical connection between a photovoltaic string and a photovoltaic energy converter reliably at low costs. The detailed description is given below.

In the specification, claims, and accompanying drawings of this application, the terms "first", "second", "third", and so on are intended to distinguish between similar objects but do not necessarily indicate a specific order or sequence.

Figure 1:
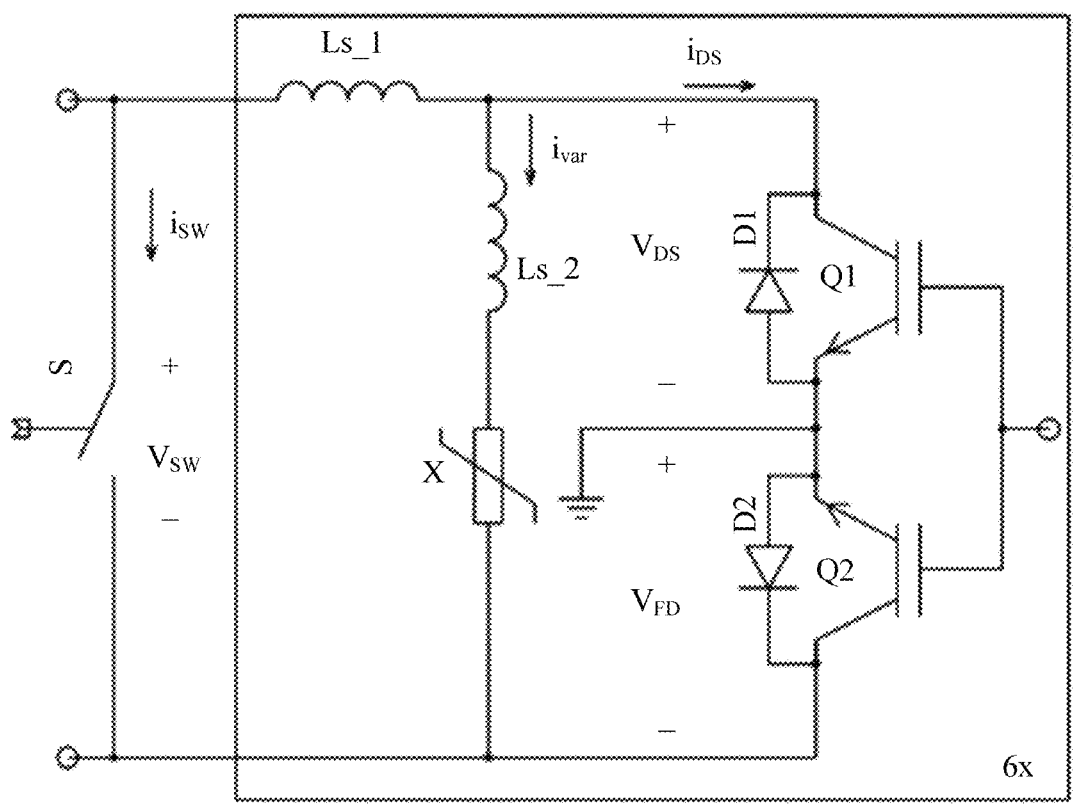
FIG. 1 is a schematic diagram of an example of a breaking apparatus in the prior art.
Figure 2:
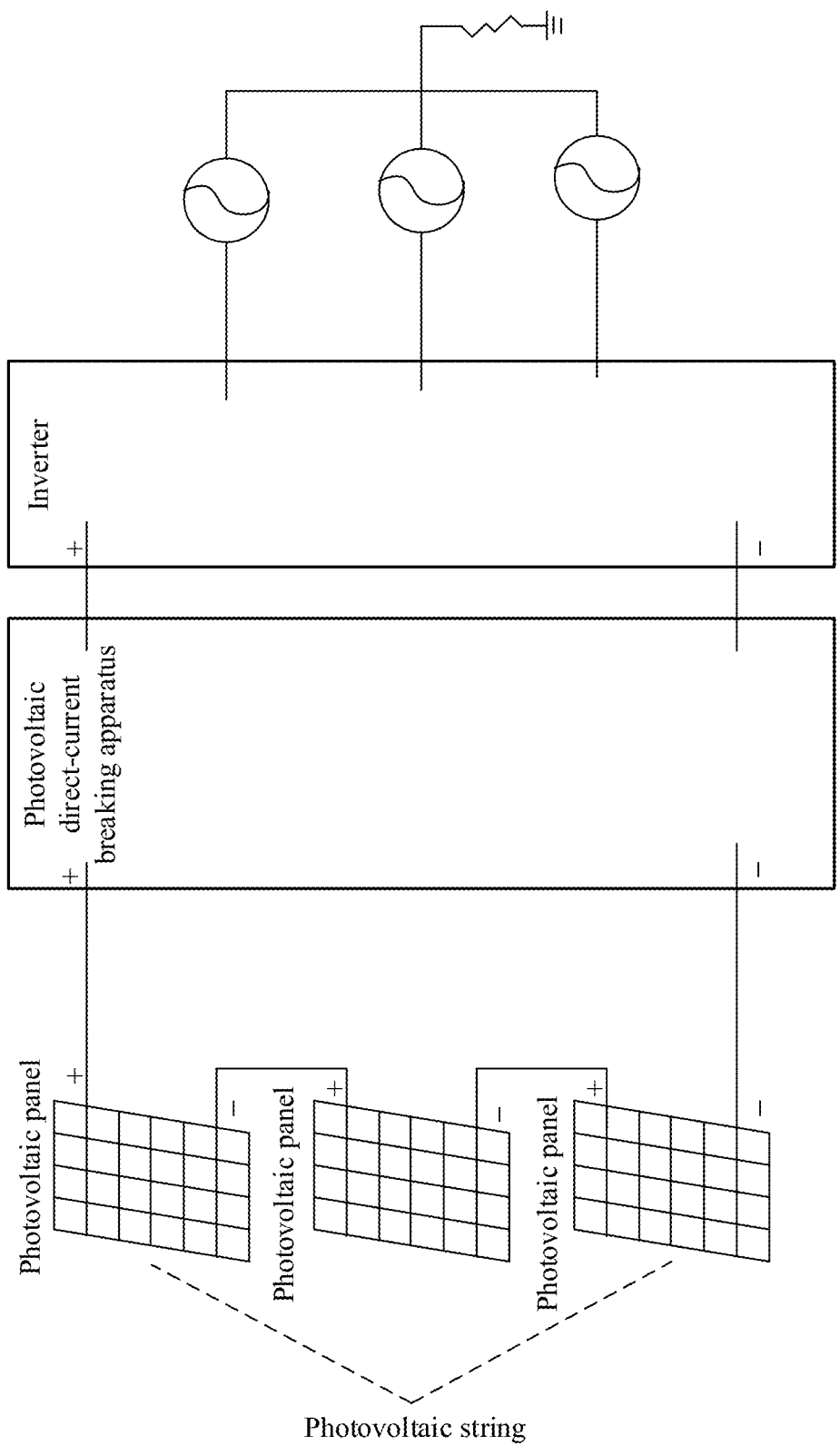
FIG. 2 is a schematic diagram of an example of a scenario of a photovoltaic power plant according to an embodiment of this application.

FIG. 2 is a schematic diagram of an example of a scenario of a photovoltaic power plant to which a photovoltaic direct-current breaking apparatus provided by an embodiment of this application is applied.

As shown in FIG. 2, in the scenario of the photovoltaic power plant, there are a plurality of photovoltaic panels, and the plurality of photovoltaic panels are connected in series to form a photovoltaic string. Certainly, there are a plurality of photovoltaic strings shown in FIG. 2 in the photovoltaic power plant. Only one photovoltaic string is used as an example for illustration in this application. A positive pole and a negative pole of the photovoltaic string are separately connected to the photovoltaic direct-current breaking apparatus, and the photovoltaic direct-current breaking apparatus is also connected to the photovoltaic energy converter. In this way, the photovoltaic direct-current breaking apparatus can control turn-on and turn-off of an electrical circuit between the photovoltaic string and the photovoltaic energy converter. In some embodiments, when the photovoltaic energy converter needs to be maintained or fails, the electrical circuit between the photovoltaic string and the photovoltaic energy converter can be quickly turned off through the photovoltaic direct-current breaking apparatus. FIG. 2 shows a situation in which one photovoltaic string is connected to one photovoltaic direct-current breaking apparatus. Actually, one photovoltaic direct-current breaking apparatus may be connected to a plurality of photovoltaic strings and can control electrical connections between the plurality of photovoltaic strings and the photovoltaic energy converter. The photovoltaic energy converters may include an inverter, an optimizer, a direct-current-to-direct current (DC/DC) converter, and a direct-current-to-alternating current (DC/AC) converter.

Figure 3:
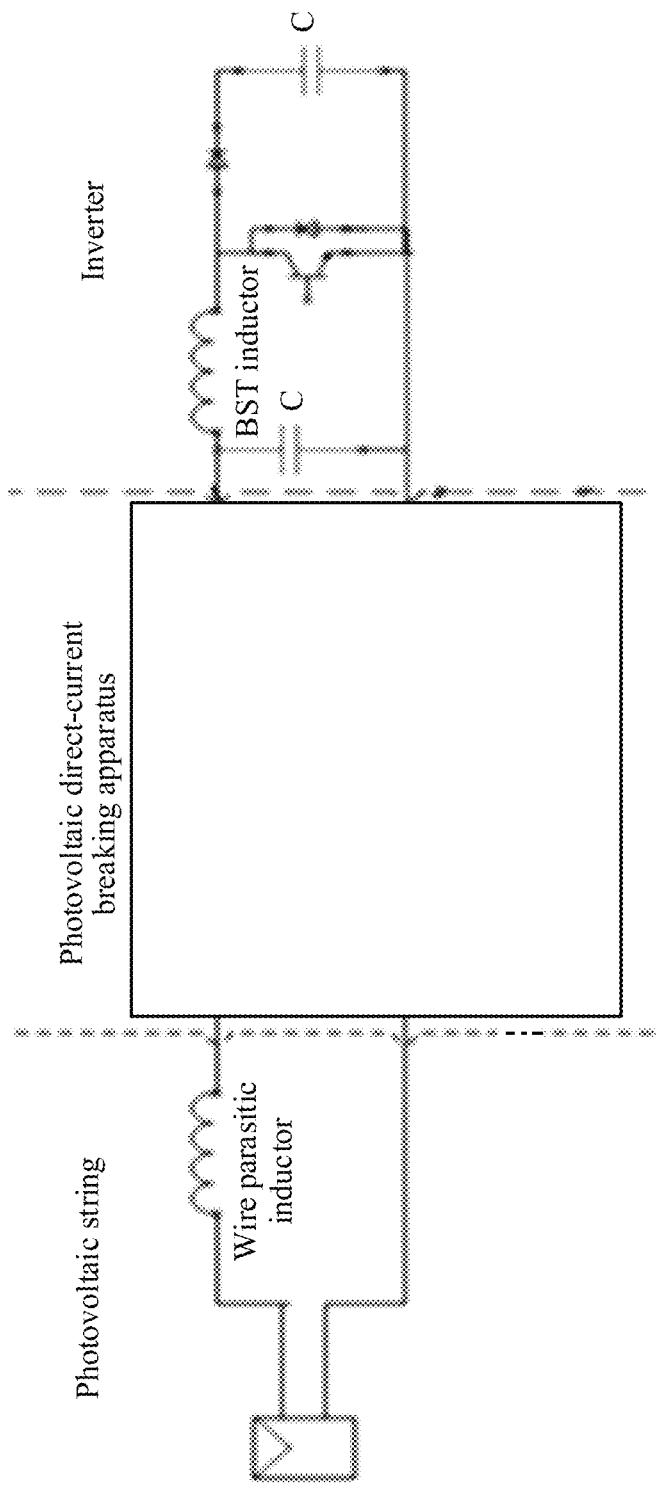
FIG. 3 is a schematic diagram of another example of a scenario of a photovoltaic power plant according to an embodiment of this application.

FIG. 3 is a schematic diagram of another example of a scenario of a photovoltaic power plant to which a photovoltaic direct-current breaking apparatus provided by an embodiment of this application is applied.

As shown in FIG. 3, in some embodiments, because a cable of the photovoltaic string has a wire parasitic inductor, energy stored in a barium strontium titanate (BST) inductor in a DC-to-DC circuit of the photovoltaic energy converter also needs to be released. Therefore, when the photovoltaic direct-current breaking apparatus in this embodiment of this application cuts off an electrical circuit between the photovoltaic string and the photovoltaic energy converter, problems such as arc discharge and electric shock ablation need to be avoided, and additionally, energy stored in the photovoltaic string and the photovoltaic energy converter need to be released, to effectively ensure safety and reliability of the photovoltaic direct-current breaking apparatus.

Figure 4:
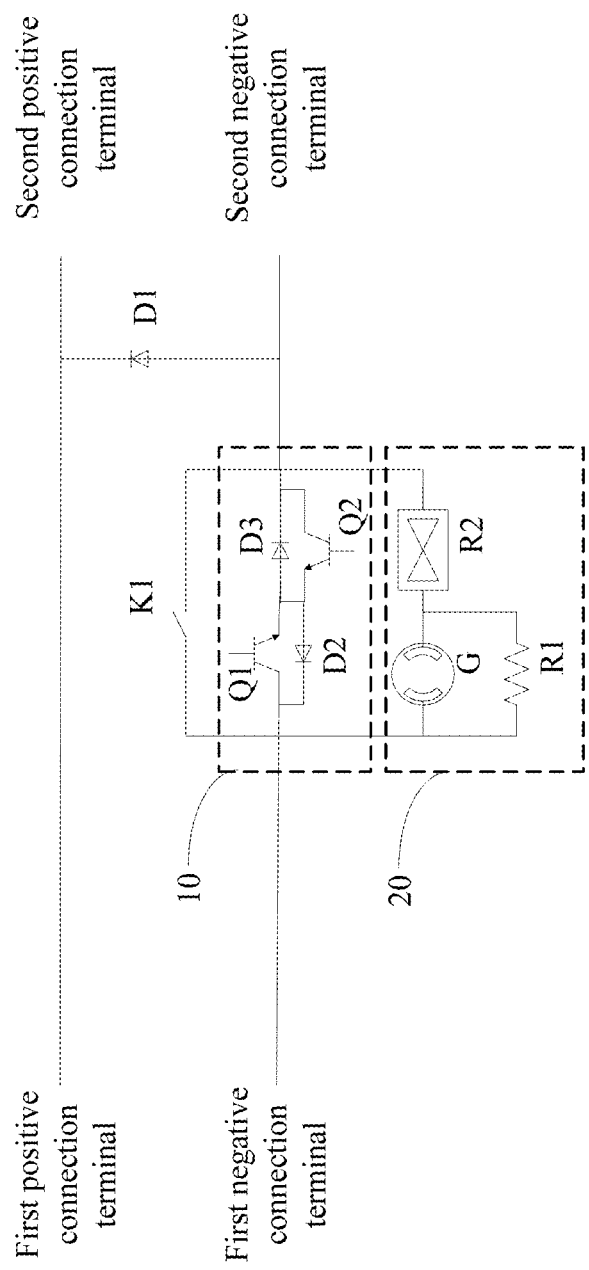
FIG. 4 is a schematic diagram of an embodiment of a photovoltaic direct-current breaking apparatus according to an embodiment of this application.

To resolve the foregoing problems, as shown in FIG. 4, an embodiment of the photovoltaic direct-current breaking apparatus provided by the embodiments of this application may include: a first positive connection terminal, a first negative connection terminal, a second positive connection terminal, a second negative connection terminal, a first switch K1, a first diode D1, a convector circuit 10, and an energy absorption circuit 20. The first positive connection terminal and the first negative connection terminal are configured to connect an output terminal of a first photovoltaic string, and the second positive connection terminal and the second negative connection terminal are configured to connect a photovoltaic energy converter.

The first switch K1, the convector circuit 10, and the energy absorption circuit 20 are connected in parallel, and are connected between the first negative connection terminal and the second negative connection terminal. A cathode of the first diode D1 is connected between the first positive connection terminal and the second positive connection terminal, and an anode of the first diode D1 is connected between the second negative connection terminal and a parallel circuit of the first switch, the convector circuit 10, and the energy absorption circuit 20.

The convector circuit 10 includes a first fully-controlled semiconductor device Q1, a second fully-controlled semiconductor device Q2, a second diode D2, and a third diode D3, where a cathode of the second diode D2 is connected to an input terminal of the first fully-controlled semiconductor device Q1, an anode of the second diode D2 is connected to an output terminal of the first fully-controlled semiconductor device Q1 and an output terminal of the second fully-controlled semiconductor device Q2, an anode of the third diode D3 is connected to the output terminal of the second fully-controlled semiconductor device Q2, and a cathode of the third diode D3 is connected to an input terminal of the second fully-controlled semiconductor device Q2.

The energy absorption circuit 20 includes a gas discharge tube G, a steady-state balance resistor R1, and a varistor R2, where the gas discharge tube G is connected in parallel to the steady-state balance resistor R1, and then connected in series to the varistor R2.

In the embodiment corresponding to FIG. 4, when the first switch K1 needs to be closed, the first fully-controlled semiconductor device Q1 and the second fully-controlled semiconductor device Q2 are first controlled to be turned on. This is because after the first fully-controlled semiconductor device Q1 and the second fully-controlled semiconductor device Q2 are turned on, a voltage across two ends of the first switch K1 is only about 1 V to 2 V; in this case, closing the first switch K1 does not cause the first switch K1 to generate arc discharge and electric shock ablation, thereby extending a service life of the first switch K1. After the first switch K1 is closed, because a conduction impedance of the first switch K1 is very small, usually only hundreds of microohms, most currents flow from the first switch K1 to the photovoltaic energy converter, thereby reducing an overall loss of the convector circuit 10. Even a switching transistor of the convector circuit 10 can be turned off in this case, so that all currents flow from the first switch K1 to the photovoltaic energy converter.

In some embodiments, when the first switch K1 needs to be opened, the first switch K1 is first controlled to be opened, so that a breaking voltage of the first switch K1 is reduced to only 1 V to 2 V, equaling a conduction voltage drop of the semiconductor device of the convector circuit 10, thereby effectively avoiding the arc discharge and electric shock ablation, and effectively protecting the first switch K1. Exactly because the solutions of this application can effectively protect the first switch K1, a device with low-voltage switch specifications may be selected as the first switch K1, thereby reducing costs of the photovoltaic direct-current breaking apparatus.

In some embodiments, when the first switch K1 is opened, because energy stored in the wire parasitic inductor of the cable of the photovoltaic string and an inductor of a DC-to-DC circuit inside the photovoltaic energy converter needs to be released, in this embodiment of this application, the first diode D1 may be used to release the energy stored in the inductor of the DC-to-DC circuit inside the photovoltaic energy converter along a path from a bus capacitor to the first diode D1 and then back to the inductor of the DC-to-DC circuit. This reduces energy absorbed by the energy absorption circuit 20 in the photovoltaic direct-current breaking apparatus, reducing required design specifications of the energy absorption circuit 20.

In some embodiments, the wire parasitic inductor of the cable of the photovoltaic string implements discharge and voltage clamping by using the energy absorption circuit 20 in the photovoltaic direct-current breaking apparatus, and ensures that a clamping voltage does not exceed specifications of the semiconductor device in the convector circuit 10. Considering characteristics of a small leakage current of the gas discharge tube G and a large leakage current of the varistor R2, to implement reliable voltage division, the steady-state balance resistors R1 are connected in parallel at both ends of the gas discharge tube G in the energy absorption circuit 20 in this embodiment of this application to provide a leakage path, so that voltages of the gas discharge tube G and the varistor R2 do not exceed the device specifications. After the gas discharge tube G is connected in parallel to the steady-state balance resistor R1, and then connected in series to the varistor R2, a static withstand voltage value of the energy absorption circuit 20 is increased through a voltage division relationship between the gas discharge tube G and the varistor R2, or the gas discharge tube G and the varistor R2 are respectively connected in parallel to steady-state balance resistors or capacitors or a combination of capacitors and resistors connected in series/parallel, to implement this function. When the energy absorption circuit 20 increases rapidly and exceeds a breakdown voltage of the gas discharge tube G, the voltage of the gas discharge tube G is clamped to a low voltage of dozens of volts. The varistor R2 acts, and a clamping voltage of the energy absorption circuit 20 is a sum of a clamping voltage of the varistor R2 and a clamping voltage of the gas discharge tube G. It can be seen that the energy absorption circuit 20 provided in this embodiment of this application can effectively reduce a voltage across two ends of the energy absorption circuit 20, thereby implementing a function of low dynamic voltage clamping of the energy absorption circuit 20, and reducing the required specifications of the varistor R2 in the energy absorption circuit 20 and the semiconductor device in the convector circuit 10.

The photovoltaic direct-current breaking apparatus provided in the embodiments of this application can implement functions of a high static withstand voltage and a low dynamic clamping voltage. Specific examples may be as follows:

In some embodiments, if the photovoltaic direct-current breaking apparatus is to break a 1000 V/10 A direct-current circuit between the photovoltaic string and the photovoltaic energy converter, and if the energy absorption circuit 20 only has the varistor, when a direct-current breaking switch is opened, a static withstand voltage of the varistor needs to meet 1000 V specification. In some embodiments, considering that the varistor needs to absorb a 10 A peak current when the convector circuit 10 is turned off, the clamping voltage of the varistor far exceeds 1500 V, and a voltage of the fully-controlled semiconductor device in the convector circuit 10 and the diode exceeds 1500 V specification. However, if the gas discharge tube is connected in series to the varistor, a 750 V gas discharge tube may be connected in parallel to the steady-state balance resistor, and then connected in series to a 360 V varistor to implement a static withstand voltage of 1100 V, meeting the application of 1000 V. The convector circuit 10 is turned off, energy stored in the wire parasitic inductor of the photovoltaic string is released through the convector circuit 10, and a voltage across two ends of the convector circuit 10 rises rapidly. When the voltage exceeds 1100 V, the gas discharge tube G breaks down, and a clamping voltage is only about 10 V. The varistor R2 acts. In the case of a 10 A current, the clamping voltage is only about 700 V, and the clamping voltage of the entire convector circuit 10 is low, not exceeding 800 V. In this case, a 1100 V specification of the semiconductor device in the convector circuit 10 can meet the application requirement, effectively reducing costs of the photovoltaic direct-current breaking apparatus.

Figure 5:
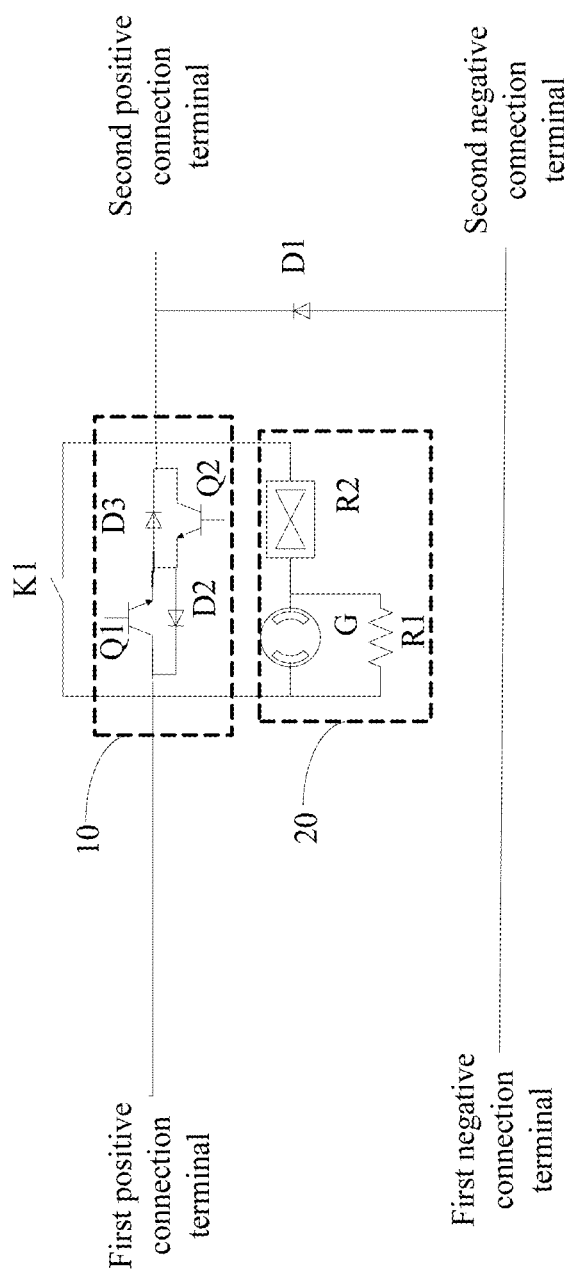
FIG. 5 is a schematic diagram of another embodiment of a photovoltaic direct-current breaking apparatus according to an embodiment of this application.

The embodiment corresponding to FIG. 4 describes a case in which the first switch K1, the convector circuit 10, and the energy absorption circuit 20 are connected in parallel between the first negative connection terminal and the second negative connection terminal. As shown in FIG. 5, the first switch K1, the convector circuit 10, and the energy absorption circuit 20 may be connected in parallel between the first positive connection terminal and the second positive connection terminal.

As shown in FIG. 5, an embodiment of the photovoltaic direct-current breaking apparatus provided by the embodiments of this application may include: a first positive connection terminal, a first negative connection terminal, a second positive connection terminal, a second negative connection terminal, a first switch K1, a first diode D1, a convector circuit 10, and an energy absorption circuit 20. The first positive connection terminal and the first negative connection terminal are configured to connect an output terminal of a first photovoltaic string, and the second positive connection terminal and the second negative connection terminal are configured to connect a photovoltaic energy converter.

The first switch K1, the convector circuit 10 and the energy absorption circuit 20 are connected in parallel, and are connected between the first positive connection terminal and the second positive connection terminal. A cathode of the first diode D1 is connected between the first positive connection terminal and the second positive connection terminal, and an anode of the first diode D1 is connected between the second negative connection terminal and a parallel circuit of the first switch, the convector circuit 10, and the energy absorption circuit 20.

The convector circuit 10 includes a first fully-controlled semiconductor device Q1, a second fully-controlled semiconductor device Q2, a second diode D2, and a third diode D3, where a cathode of the second diode D2 is connected to an input terminal of the first fully-controlled semiconductor device Q1, an anode of the second diode D2 is connected to an output terminal of the first fully-controlled semiconductor device Q1 and an output terminal of the second fully-controlled semiconductor device Q2, an anode of the third diode D3 is connected to the output terminal of the second fully-controlled semiconductor device Q2, and a cathode of the third diode D3 is connected to an input terminal of the second fully-controlled semiconductor device Q2.

The energy absorption circuit 20 includes a gas discharge tube G, a steady-state balance resistor R1, and a varistor R2, where the gas discharge tube G is connected in parallel to the steady-state balance resistor R1, and then connected in series to the varistor R2.

Functions implemented by the embodiment corresponding to FIG. 5 are the same as those implemented by the embodiment corresponding to FIG. 4, except that the first switch K1, the convector circuit 10, and the energy absorption circuit 20 are connected in parallel, and then connected between the first positive connection terminal and the second positive connection terminal.

The embodiments described in FIG. 4 and FIG. 5 resolve the problems of arc discharge and electric shock ablation, and also effectively reduce required specifications of the semiconductor device and the varistor, thereby ensuring safety and reliability of the photovoltaic direct-current breaking apparatus. Actually, the safety and reliability of the photovoltaic direct-current breaking apparatus in the embodiments of this application may be further improved.

Figure 6:
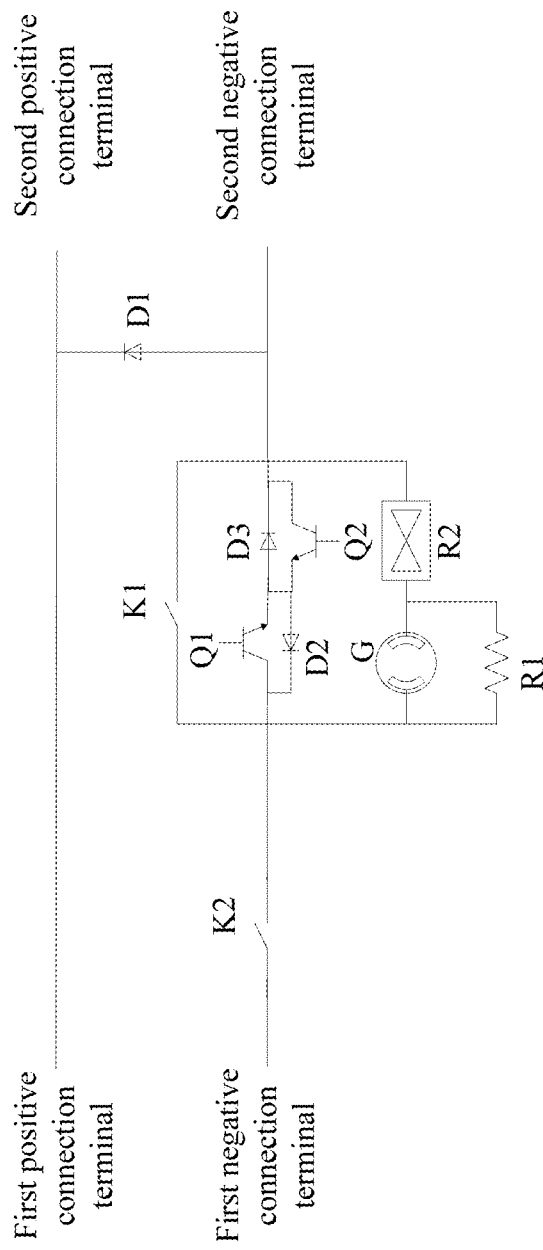
FIG. 6 is a schematic diagram of another embodiment of a photovoltaic direct-current breaking apparatus according to an embodiment of this application.

In some embodiments, as shown in FIG. 6, based on the embodiment corresponding to FIG. 4, in another embodiment of the photovoltaic direct-current breaking apparatus provided in the embodiments of this application, the photovoltaic direct-current breaking apparatus includes a second switch K2. When the first switch K1, the convector circuit 10 and the energy absorption circuit 20 are connected in parallel, and are connected between the first negative connection terminal and the second negative connection terminal, one end of the second switch K2 is connected to the first negative connection terminal, and the other end of the second switch K2 is connected to one end of the first switch K1, the cathode of the second diode D2 and one end of the gas discharge tube G.

Actually, a position of the second switch K2 is not limited to the position described in FIG. 6. It may also be that one end of the second switch K2 is connected to the second negative connection terminal and the anode of the first diode D1, and the other end of the second switch K2 is connected to one end of the first switch K1, the cathode of the third diode D3, and one end of the varistor R2.

In this embodiment of this application, the second switch K2 is opened after the first switch K1. In this case, the convector circuit 10 is turned off, and the energy absorption circuit 20 has a high impedance. When the second switch K2 is opened, there is no voltage or current, and therefore a switch device with low-voltage specifications may be selected as the second switch K2 to implement reliable breaking in compliance with safety regulations.

Figure 7:
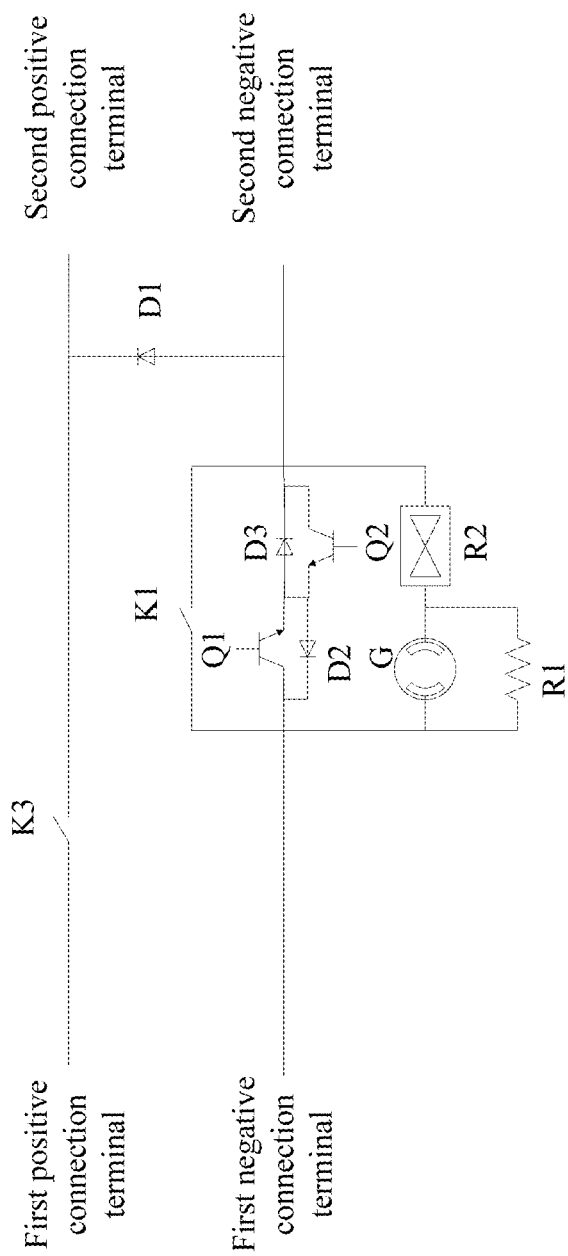
FIG. 7 is a schematic diagram of another embodiment of a photovoltaic direct-current breaking apparatus according to an embodiment of this application.

In some embodiments, as shown in FIG. 7, based on the embodiment corresponding to FIG. 4, in another embodiment of the photovoltaic direct-current breaking apparatus provided in the embodiments of this application, the photovoltaic direct-current breaking apparatus includes a third switch K3, where the third switch K3 is connected between the first positive connection terminal and a connection point of the second positive connection terminal and the cathode of the first diode D1.

In this embodiment of this application, the third switch K3 is opened after the first switch K1. In this case, the convector circuit 10 is turned off, and the energy absorption circuit 20 has a high impedance. When the third switch K3 is opened, there is no voltage or current, and therefore a switch device with low-voltage specifications may be selected as the third switch K3 to implement reliable breaking in compliance with safety regulations.

Figure 8:
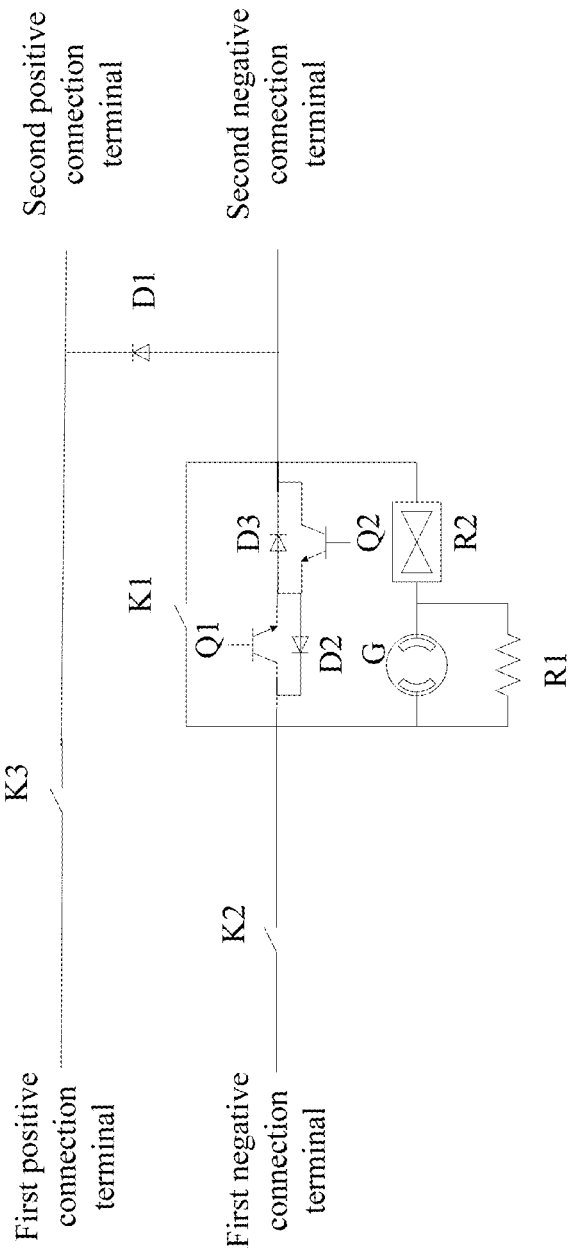
FIG. 8 is a schematic diagram of another embodiment of a photovoltaic direct-current breaking apparatus according to an embodiment of this application.

In some embodiments, as shown in FIG. 8, based on the embodiment corresponding to FIG. 6, in another embodiment of the photovoltaic direct-current breaking apparatus provided in the embodiments of this application, the photovoltaic direct-current breaking apparatus includes a third switch K3, where the third switch K3 is connected between the first positive connection terminal and a connection point of the second positive connection terminal and the cathode of the first diode D1.

In this embodiment of this application, the second switch K2 and the third switch K3 are both opened after the first switch K1. In this case, the convector circuit 10 is turned off, and the energy absorption circuit 20 has a high impedance. When the second switch K2 and the third switch K3 are opened, there is no voltage or current, and therefore a switch device with low-voltage specifications may be selected as the third switch K3 to implement reliable breaking in compliance with safety regulations.

Figure 9:
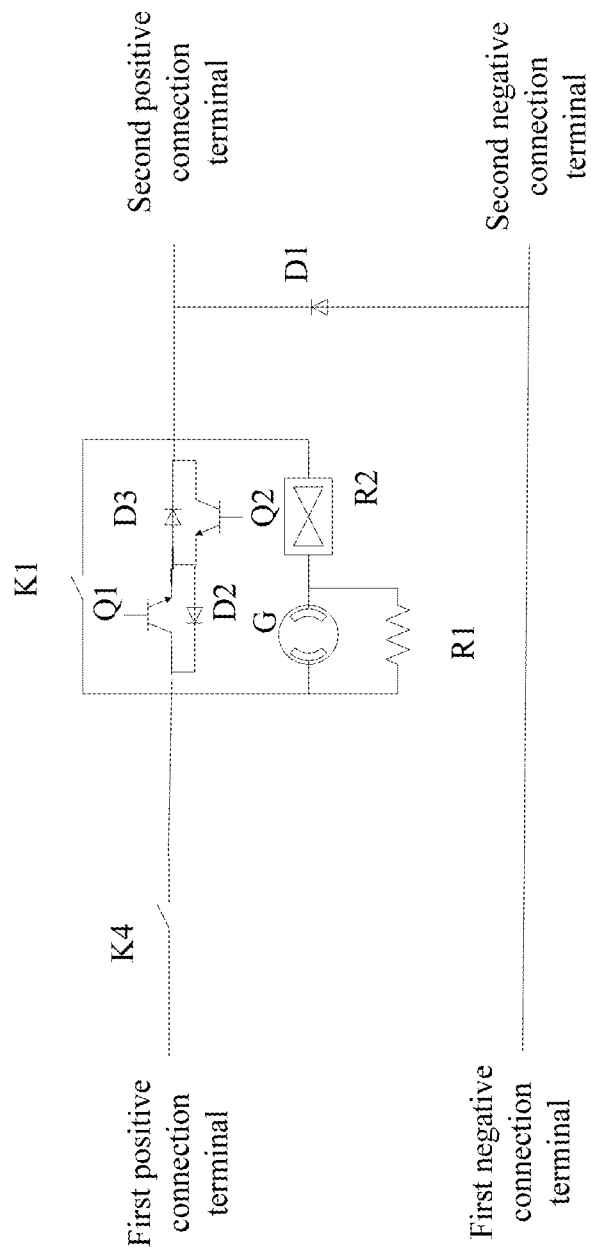
FIG. 9 is a schematic diagram of another embodiment of a photovoltaic direct-current breaking apparatus according to an embodiment of this application.

In some embodiments, as shown in FIG. 9, based on the embodiment corresponding to FIG. 5, in another embodiment of the photovoltaic direct-current breaking apparatus provided in the embodiments of this application, the photovoltaic direct-current breaking apparatus includes a fourth switch K4. When the first switch K1, the convector circuit 10, and the energy absorption circuit 20 are connected in parallel, and are connected between the first positive connection terminal and the second positive connection terminal, one end of the fourth switch K4 is connected to the first positive connection terminal, and the other end of the fourth switch K4 is connected to one end of the first switch, the cathode of the second diode, and one end of the gas discharge tube.

Actually, a position of the fourth switch K4 is not limited to the situation described in FIG. 9. It may also be that one end of the fourth switch K4 is connected to the second positive connection terminal and the cathode of the first diode D1, and the other end of the fourth switch K4 is connected to one end of the first switch K1, the cathode of the third diode D3 and one end of the varistor R2.

In this embodiment of this application, the fourth switch K4 is opened after the first switch K1. In this case, the convector circuit 10 is turned off, and the energy absorption circuit 20 has a high impedance. When the fourth switch K4 is opened, there is no voltage or current, and therefore a switch device with low-voltage specifications may be selected as the fourth switch K4 to implement reliable breaking in compliance with safety regulations.

Figure 10:
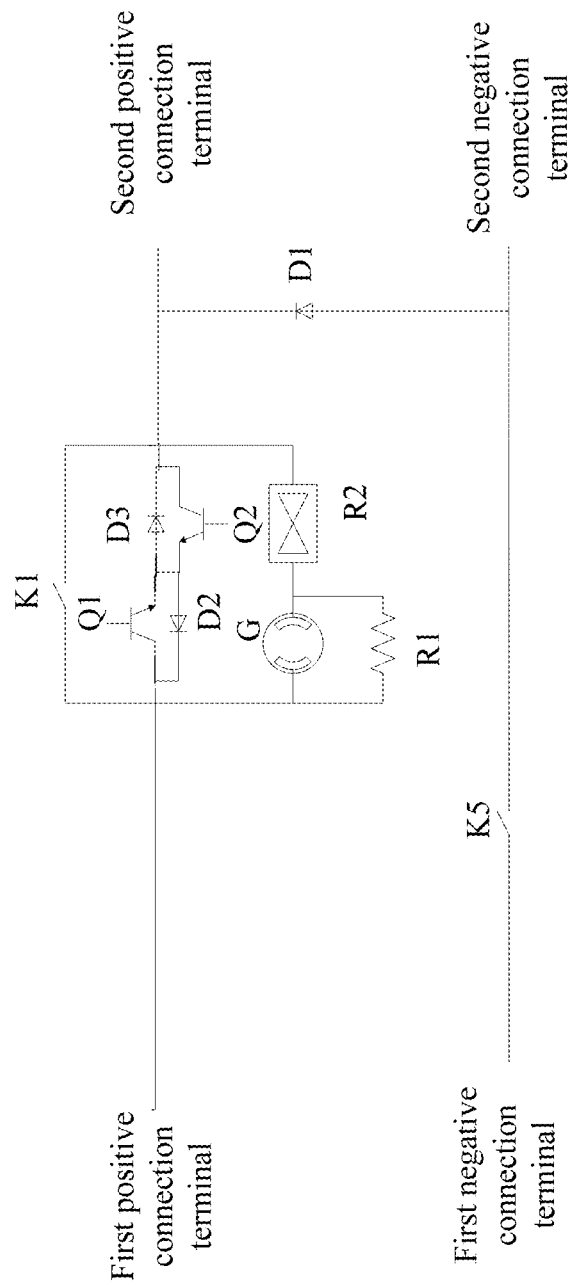
FIG. 10 is a schematic diagram of another embodiment of a photovoltaic direct-current breaking apparatus according to an embodiment of this application.

In some embodiments, as shown in FIG. 10, based on the embodiment corresponding to FIG. 5, in another embodiment of the photovoltaic direct-current breaking apparatus provided in the embodiments of this application, the photovoltaic direct-current breaking apparatus includes a fifth switch K5. The fifth switch K5 is connected between the first negative connection terminal and a connection point of the second negative connection terminal and the anode of the first diode D1.

In this embodiment of this application, the fifth switch K5 is opened after the first switch K1. In this case, the convector circuit 10 is turned off, and the energy absorption circuit 20 has a high impedance. When the fifth switch K5 is opened, there is no voltage or current, and therefore a switch device with low-voltage specifications may be selected as the fifth switch K5 to implement reliable breaking in compliance with safety regulations.

Figure 11:
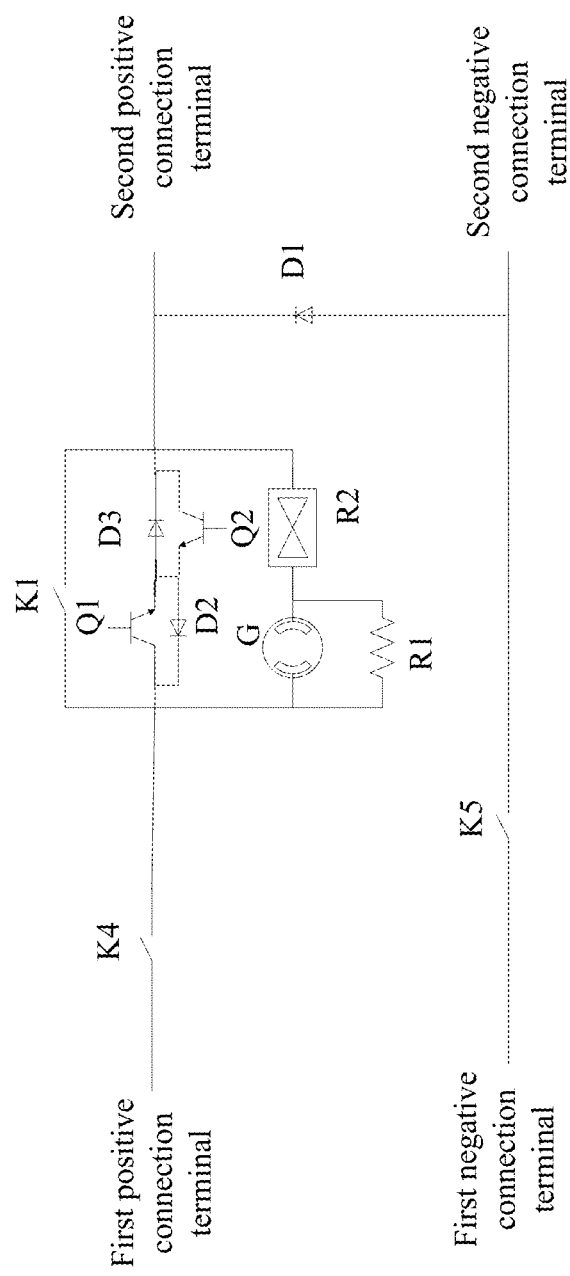
FIG. 11 is a schematic diagram of another embodiment of a photovoltaic direct-current breaking apparatus according to an embodiment of this application.

In some embodiments, as shown in FIG. 11, based on the embodiment corresponding to FIG. 9, in another embodiment of the photovoltaic direct-current breaking apparatus provided in the embodiments of this application, the photovoltaic direct-current breaking apparatus includes a fifth switch K5. The fifth switch K5 is connected between the first negative connection terminal and a connection point of the second negative connection terminal and the anode of the first diode D1.

In this embodiment of this application, the fourth switch K4 and the fifth switch K5 are opened after the first switch K1. In this case, the convector circuit 10 is turned off, and the energy absorption circuit 20 has a high impedance. When the fourth switch K4 and the fifth switch K5 are opened, there is no voltage or current, and therefore a switch device with low-voltage specifications may be selected as the fifth switch K5 to implement reliable breaking in compliance with safety regulations.

Figure 12:
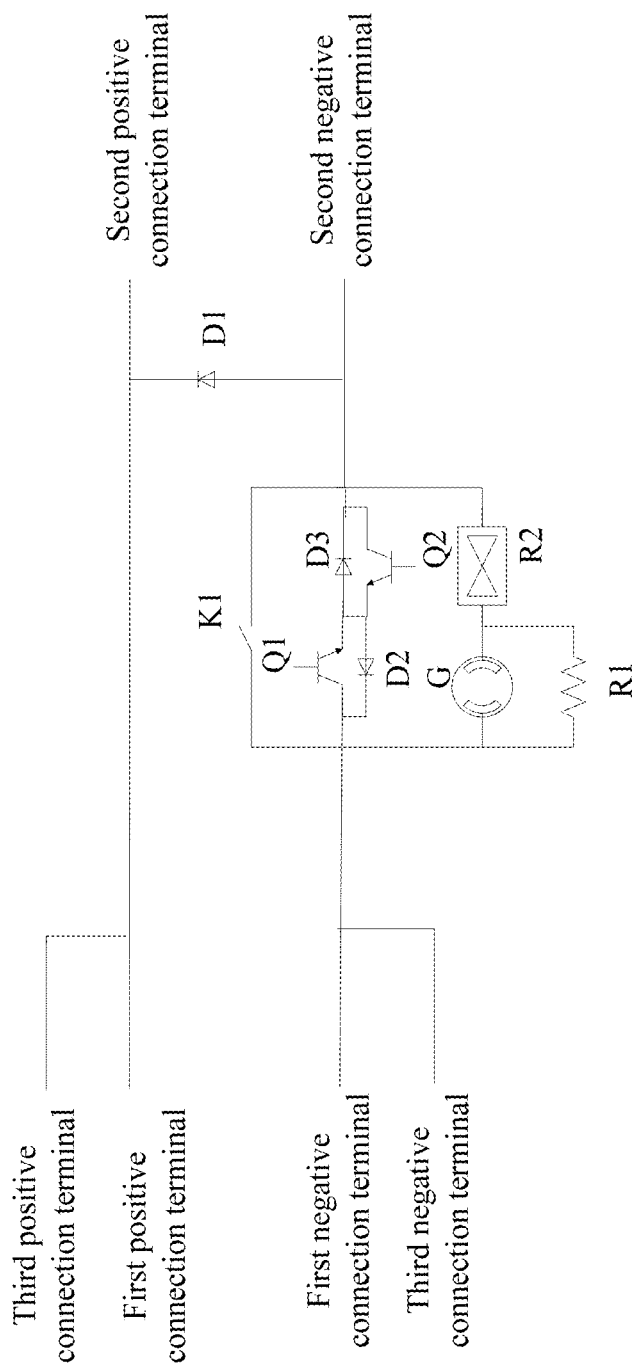
FIG. 12 is a schematic diagram of another embodiment of a photovoltaic direct-current breaking apparatus according to an embodiment of this application.
Figure 13:
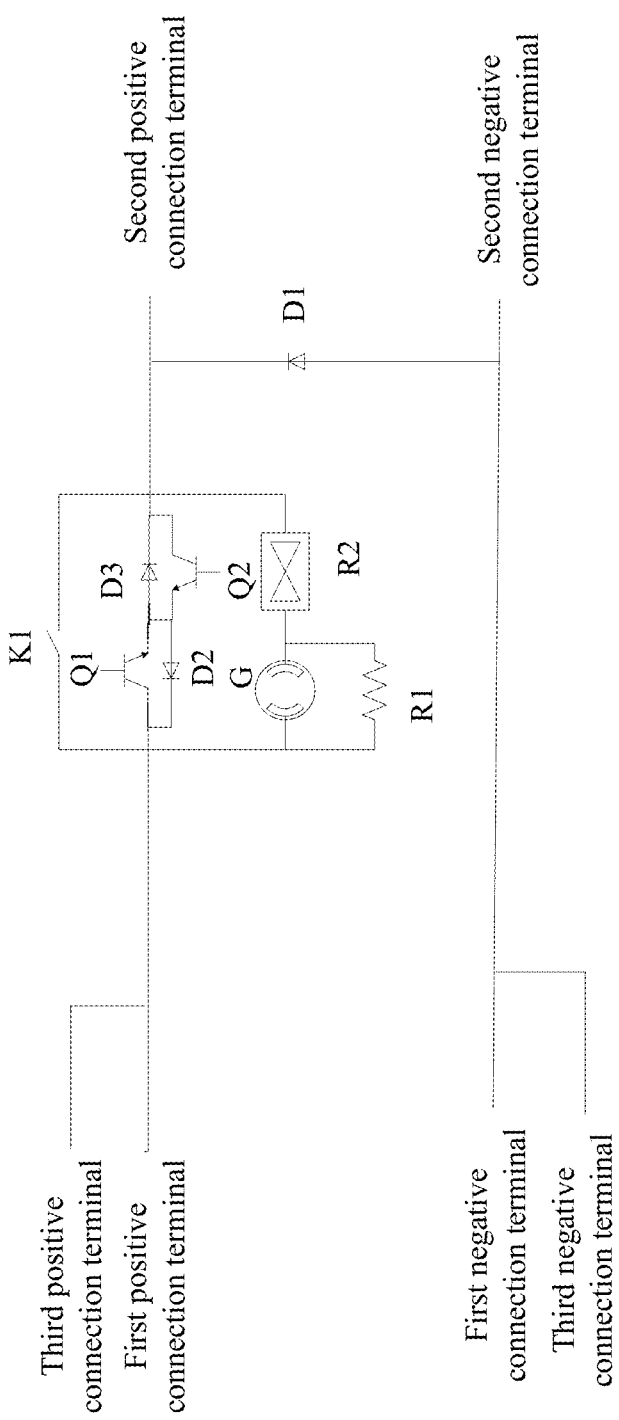
FIG. 13 is a schematic diagram of another embodiment of a photovoltaic direct-current breaking apparatus according to an embodiment of this application.

The photovoltaic direct-current breaking apparatus described in the foregoing embodiments only has two positive connection terminals and two negative connection terminals. Actually, one photovoltaic direct-current breaking apparatus may include a plurality of positive connection terminals and a plurality of negative connection terminals. As shown in FIG. 12 and FIG. 13, the photovoltaic direct-current breaking apparatus may include a third positive connection terminal and a third negative connection terminal, where the third negative connection terminal is connected between the first negative connection terminal and the second negative connection terminal; the third positive connection terminal is connected between the first positive connection terminal and the second positive connection terminal; and the third positive connection terminal and the third negative connection terminal are configured to connect a second photovoltaic string.

As shown in FIG. 12, based on the embodiment corresponding to FIG. 4, the third positive connection terminal and the third negative connection terminal are added. The third negative connection terminal is connected between the first negative connection terminal and the parallel circuit of the first switch, the convector circuit 10, and the energy absorption circuit 20; the third positive connection terminal is connected between the first positive connection terminal and a connection point of the second positive connection terminal and the cathode of the first diode D1, and the third positive connection terminal and the third negative connection terminal are configured to connect an input terminal of a second photovoltaic string.

As shown in FIG. 13, based on the embodiment corresponding to FIG. 5, the third positive connection terminal and the third negative connection terminal are added. The third negative connection terminal is connected between the first negative connection terminal and the parallel circuit of the first switch, the convector circuit 10, and the energy absorption circuit 20; the third positive connection terminal is connected between the first positive connection terminal and a connection point of the second positive connection terminal and the cathode of the first diode D1, and the third positive connection terminal and the third negative connection terminal are configured to connect an input terminal of a second photovoltaic string.

In the embodiments corresponding to FIG. 12 and FIG. 13, the third positive connection terminal and the third negative connection terminal are configured to connect the input terminal of the second photovoltaic string, indicating that the second photovoltaic string and the first photovoltaic string can share one photovoltaic direct-current breaking apparatus to perform breaking control between the photovoltaic string and the photovoltaic energy converter. A voltage and a current of the second photovoltaic string are transferred to the photovoltaic energy converter through the second positive connection terminal and the second negative connection terminal of the photovoltaic direct-current breaking apparatus.

A control principle regarding two or more photovoltaic strings sharing one photovoltaic direct-current breaking apparatus to perform breaking between the photovoltaic strings and the photovoltaic energy converter is the same as a principle described in the foregoing embodiments, and details are not repeated again.

Figure 14:
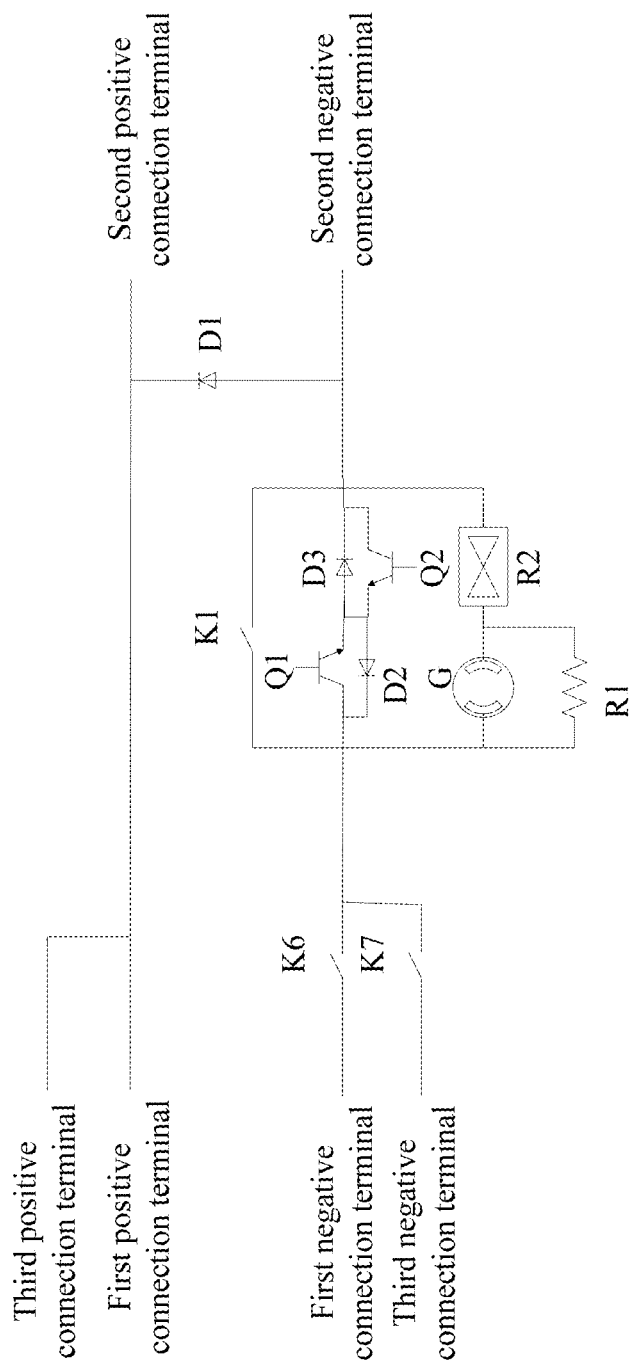
FIG. 14 is a schematic diagram of another embodiment of a photovoltaic direct-current breaking apparatus according to an embodiment of this application.

In some embodiments, based on the embodiment corresponding to FIG. 12, as shown in FIG. 14, in another embodiment of the photovoltaic direct-current breaking apparatus provided in the embodiments of this application, the photovoltaic direct-current breaking apparatus includes a sixth switch K6 and a seventh switch K7, where one end of the sixth switch K6 is connected to the first negative connection terminal, and the other end of the sixth switch K6 is connected to one end of the first switch K1, the cathode of the second diode D2, and one end of the gas discharge tube G; and one end of the seventh switch K7 is connected to the third negative connection terminal, and the other end of the seventh switch K7 is connected to one end of the first switch K1, the cathode of the second diode D2 and one end of the gas discharge tube G.

In this embodiment of this application, regardless of controlling a direct-current circuit between the first photovoltaic string and the photovoltaic energy converter or controlling a direct-current circuit between the second photovoltaic string and the photovoltaic energy converter, the sixth switch K6 or the seventh switch K7 is opened after the first switch K1. In this case, the convector circuit 10 is turned off, and the energy absorption circuit 20 has a high impedance. When the sixth switch K6 or the seventh switch K7 is opened, there is no voltage or current, and therefore a switch device with low-voltage specifications may be selected as the sixth switch K6 or the seventh switch K7 to implement reliable breaking in compliance with safety regulations.

Figure 15:
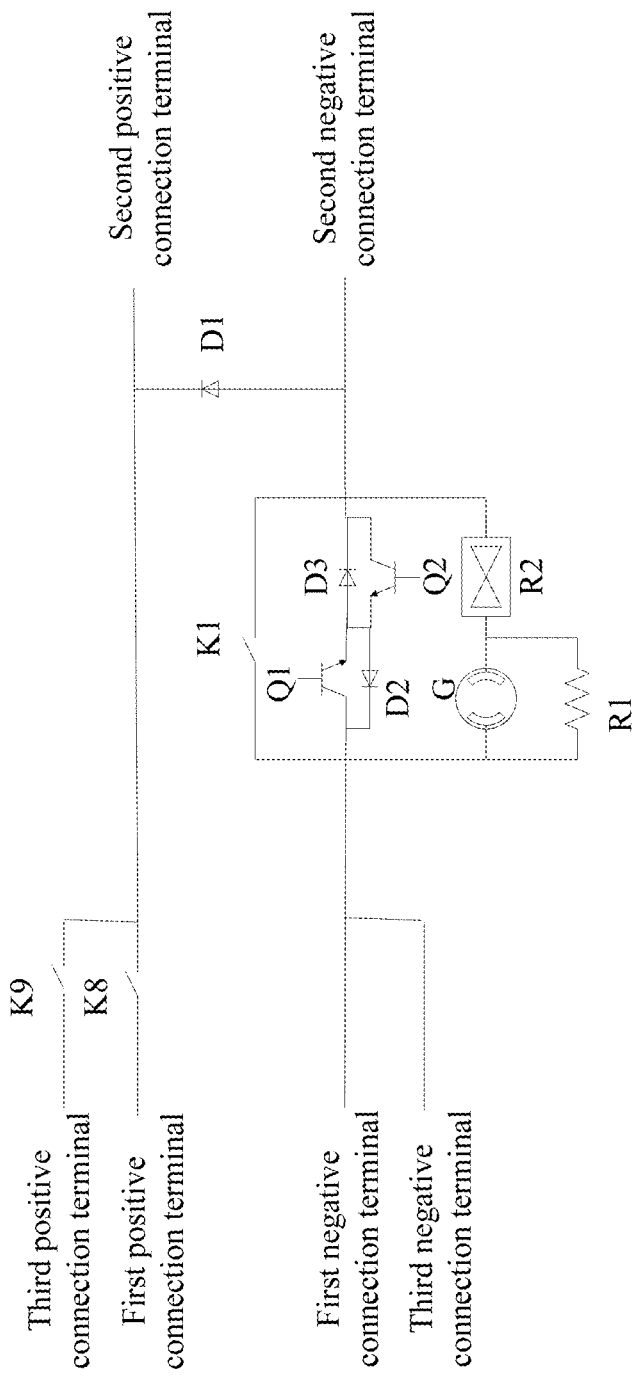
FIG. 15 is a schematic diagram of another embodiment of a photovoltaic direct-current breaking apparatus according to an embodiment of this application.

In some embodiments, based on the embodiment corresponding to FIG. 12, as shown in FIG. 15, in another embodiment of the photovoltaic direct-current breaking apparatus provided in the embodiments of this application, the photovoltaic direct-current breaking apparatus includes an eighth switch K8 and a ninth switch K9, where the eighth switch K8 is connected between the first positive connection terminal and the connection point of the second positive connection terminal and the cathode of the first diode D1; and one end of the ninth switch K9 is connected to the third positive connection terminal, and the other end of the ninth switch K8 is connected to the third positive connection terminal and the connection point of the second positive connection terminal and the cathode of the first diode D1.

In this embodiments of this application, regardless of controlling a direct-current circuit between the first photovoltaic string and the photovoltaic energy converter or controlling a direct-current circuit between the second photovoltaic string and the photovoltaic energy converter, the eighth switch K8 or the ninth switch K9 is opened after the first switch K1. In this case, the convector circuit 10 is turned off, and the energy absorption circuit 20 has a high impedance. When the eighth switch K8 or the ninth switch K9 is opened, there is no voltage or current, and therefore a switch device with low-voltage specifications may be selected as the eighth switch K8 or the ninth switch K9 to implement reliable breaking in compliance with safety regulations.

Figure 16:
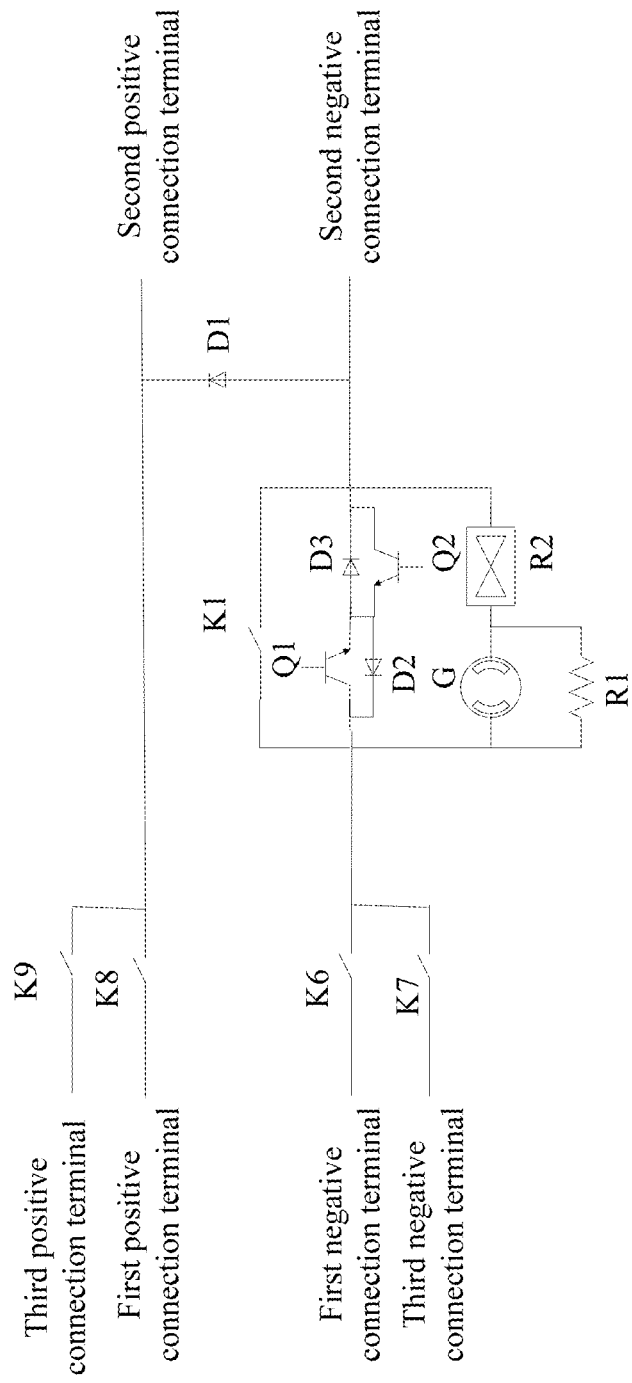
FIG. 16 is a schematic diagram of another embodiment of a photovoltaic direct-current breaking apparatus according to an embodiment of this application.

In some embodiments, based on the embodiment corresponding to FIG. 14, as shown in FIG. 16, in another embodiment of the photovoltaic direct-current breaking apparatus provided in the embodiments of this application, the photovoltaic direct-current breaking apparatus includes an eighth switch K8 and a ninth switch K9, where the eighth switch K8 is connected between the first positive connection terminal and the connection point of the second positive connection terminal and the cathode of the first diode D1; and one end of the ninth switch K9 is connected to the third positive connection terminal, and the other end of the ninth switch K8 is connected to the third positive connection terminal and the connection point of the second positive connection terminal and the cathode of the first diode D1.

In this embodiment of this application, regardless of controlling a direct-current circuit between the first photovoltaic string and the photovoltaic energy converter or controlling a direct-current circuit between the second photovoltaic string and the photovoltaic energy converter, the sixth switch K6, the seventh switch K7, the eighth switch K8, or the ninth switch K9 is opened after the first switch K1. In this case, the convector circuit 10 is turned off, and the energy absorption circuit 20 has a high impedance. When the sixth switch K6, the seventh switch K7, the eighth switch K8 or the ninth switch K9 is opened, there is no voltage or current, and therefore a switch device with low-voltage specifications may be selected as the sixth switch K6, the seventh switch K7, the eighth switch K8, or the ninth switch K9 to implement reliable breaking in compliance with safety regulations.

Figure 17:
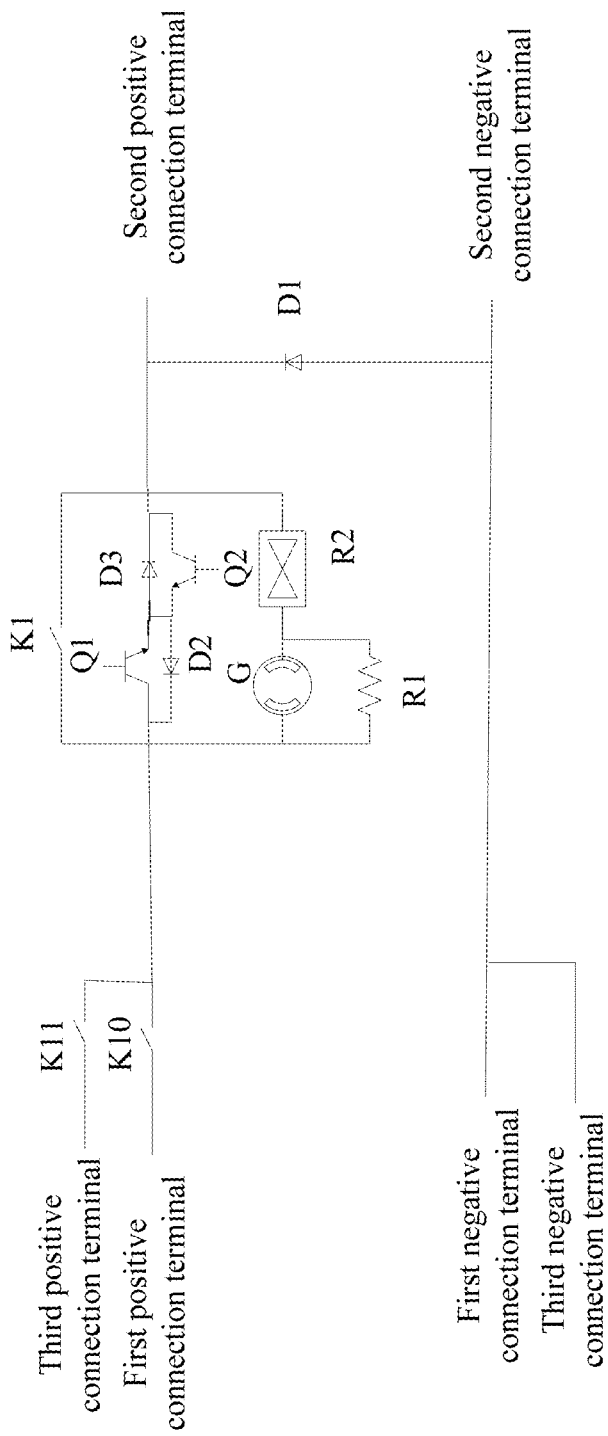
FIG. 17 is a schematic diagram of another embodiment of a photovoltaic direct-current breaking apparatus according to an embodiment of this application.
Figure 18:
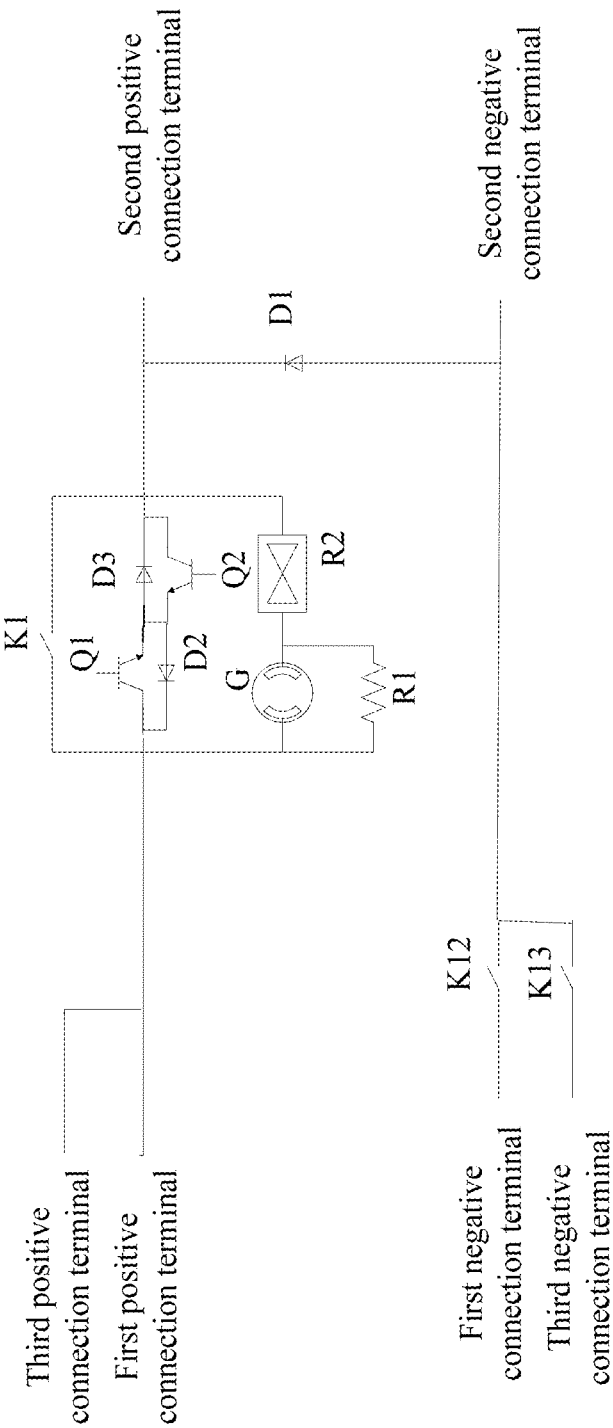
FIG. 18 is a schematic diagram of another embodiment of a photovoltaic direct-current breaking apparatus according to an embodiment of this application.
Figure 19:
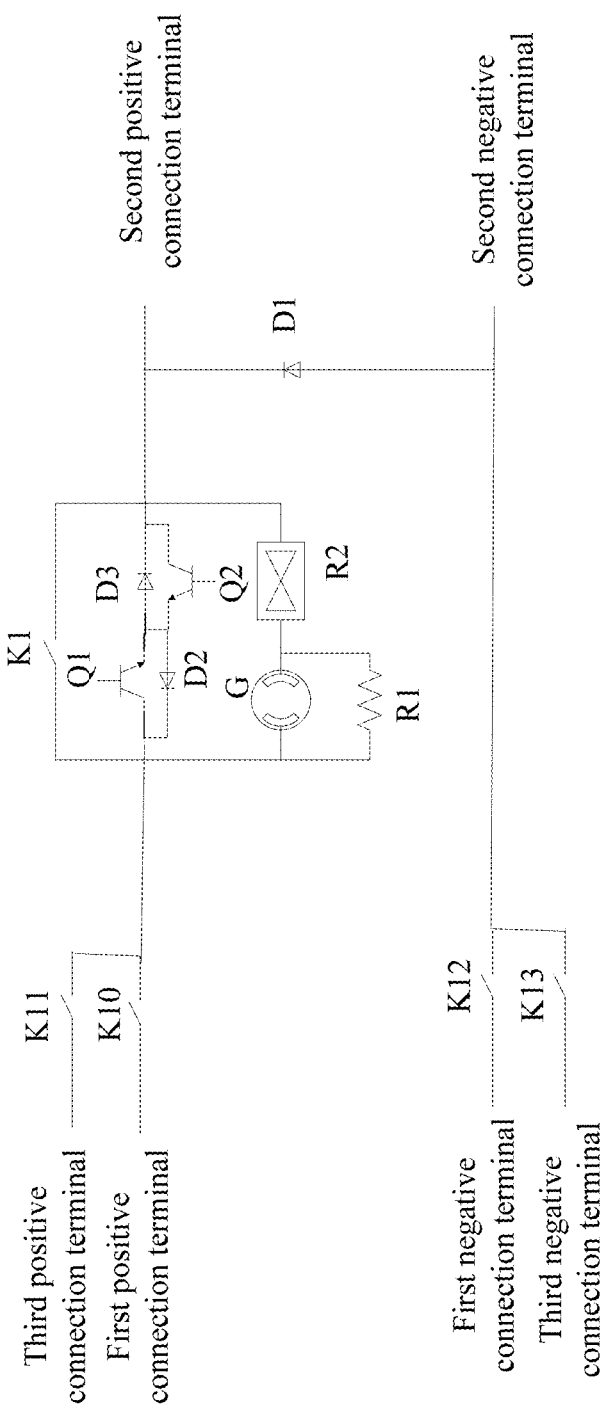
FIG. 19 is a schematic diagram of another embodiment of a photovoltaic direct-current breaking apparatus according to an embodiment of this application.

In addition, it should be noted that FIG. 17 to FIG. 19 use connection of two photovoltaic strings as an example for illustration. In some embodiments, a plurality of photovoltaic strings may be connected as required. In some embodiments, a principle of connection of a plurality of photovoltaic strings is basically the same as a principle in FIG. 17 to FIG. 19. In the embodiments of this application, connection of three or more photovoltaic strings is not described.

In some embodiments, based on the embodiment corresponding to FIG. 13, as shown in FIG. 17, in another embodiment of the photovoltaic direct-current breaking apparatus provided in the embodiments of this application, the photovoltaic direct-current breaking apparatus includes a tenth switch K10 and an eleventh switch K11, where one end of the tenth switch K10 is connected to the first positive connection terminal, and the other end of the tenth switch K10 is connected to one end of the first switch K1, the cathode of the second diode D2, and one end of the gas discharge tube G; and one end of the eleventh switch K11 is connected to the third positive connection terminal, and the other end of the eleventh switch K11 is connected to one end of the first switch K1, the cathode of the second diode D2, and one end of the gas discharge tube G.

In this embodiment of this application, regardless of controlling a direct-current circuit between the first photovoltaic string and the photovoltaic energy converter or controlling a direct-current circuit between the second photovoltaic string and the photovoltaic energy converter, the tenth switch K10 or the eleventh switch K11 is opened after the first switch K1. In this case, the convector circuit 10 is turned off, and the energy absorption circuit 20 has a high impedance. When the tenth switch K10 or the eleventh switch K11 is opened, there is no voltage or current, and therefore a switch device with low-voltage specifications may be selected as the tenth switch K10 or the eleventh switch K11 to implement reliable breaking in compliance with safety regulations.

In some embodiments, based on the embodiment corresponding to FIG. 13, as shown in FIG. 18, in another embodiment of the photovoltaic direct-current breaking apparatus provided in the embodiments of this application, the photovoltaic direct-current breaking apparatus includes a twelfth switch K12 and a thirteenth switch K13, where the twelfth switch K12 is connected between the first negative connection terminal and the connection point of the second negative connection terminal and the cathode of the first diode D1; and one end of the thirteenth switch K13 is connected to the third negative connection terminal, and the other end of the thirteenth switch K13 is connected between the third negative connection terminal and a connection point of the second negative connection terminal and the anode of the first diode D1.

In this embodiments of this application, regardless of controlling a direct-current circuit between the first photovoltaic string and the photovoltaic energy converter or controlling a direct-current circuit between the second photovoltaic string and the photovoltaic energy converter, the twelfth switch K12 or the thirteenth switch K13 is opened after the first switch K1. In this case, the convector circuit 10 is turned off, and the energy absorption circuit 20 has a high impedance. When the twelfth switch K12 or the thirteenth switch K13 is opened, there is no voltage or current, and therefore a switch device with low-voltage specifications may be selected as the twelfth switch K12 or the thirteenth switch K13 to implement reliable breaking in compliance with safety regulations.

In some embodiments, based on the embodiment corresponding to FIG. 17, as shown in FIG. 19, in another embodiment of the photovoltaic direct-current breaking apparatus provided in the embodiments of this application, the photovoltaic direct-current breaking apparatus includes a twelfth switch K12 and a thirteenth switch K13, where the twelfth switch K12 is connected between the first negative connection terminal and the connection point of the second negative connection terminal and the cathode of the first diode D1; and one end of the thirteenth switch K13 is connected to the third negative connection terminal, and the other end of the thirteenth switch K13 is connected between the third negative connection terminal and a connection point of the second negative connection terminal and the anode of the first diode D1.

In this embodiment of this application, regardless of controlling a direct-current circuit between the first photovoltaic string and the photovoltaic energy converter or controlling a direct-current circuit between the second photovoltaic string and the photovoltaic energy converter, the tenth switch K10, the eleventh switch K11, the twelfth switch K12, or the thirteenth switch K13 is opened after the first switch K1. In this case, the convector circuit 10 is turned off, and the energy absorption circuit 20 has a high impedance. When the tenth switch K10, the eleventh switch K11, the twelfth switch K12, or the thirteenth switch K13 is opened, there is no voltage or current, and therefore a switch device with low-voltage specifications may be selected as the tenth switch K10, the eleventh switch K11, the twelfth switch K12, or the thirteenth switch K13 to implement reliable breaking in compliance with safety regulations.

In the foregoing solutions with a plurality of positive connection terminals and a plurality of negative connection terminals provided in FIG. 12 to FIG. 19, a connection is internally implemented through the photovoltaic direct-current breaking apparatus. For example, the first positive connection terminal and the first negative connection terminal, as well as the third positive connection terminal and the third negative connection terminal share the second positive connection terminal and the second negative connection terminal on a side of the photovoltaic energy converter. Actually, in the embodiments provided in this application, it is not limited that the first positive connection terminal and the first negative connection terminal, as well as the third positive connection terminal and the third negative connection terminal share the second positive connection terminal and the second negative connection terminal on the side of the photovoltaic energy converter.

In addition, it should be noted that FIG. 17 to FIG. 19 use connection of two photovoltaic strings as an example for illustration. In some embodiments, a plurality of photovoltaic strings may be connected as required. A principle of connection of a plurality of photovoltaic strings is basically the same as a principle in FIG. 12 to FIG. 16. In this embodiment of this application, connection of three or more photovoltaic strings is not described.

Figure 20:
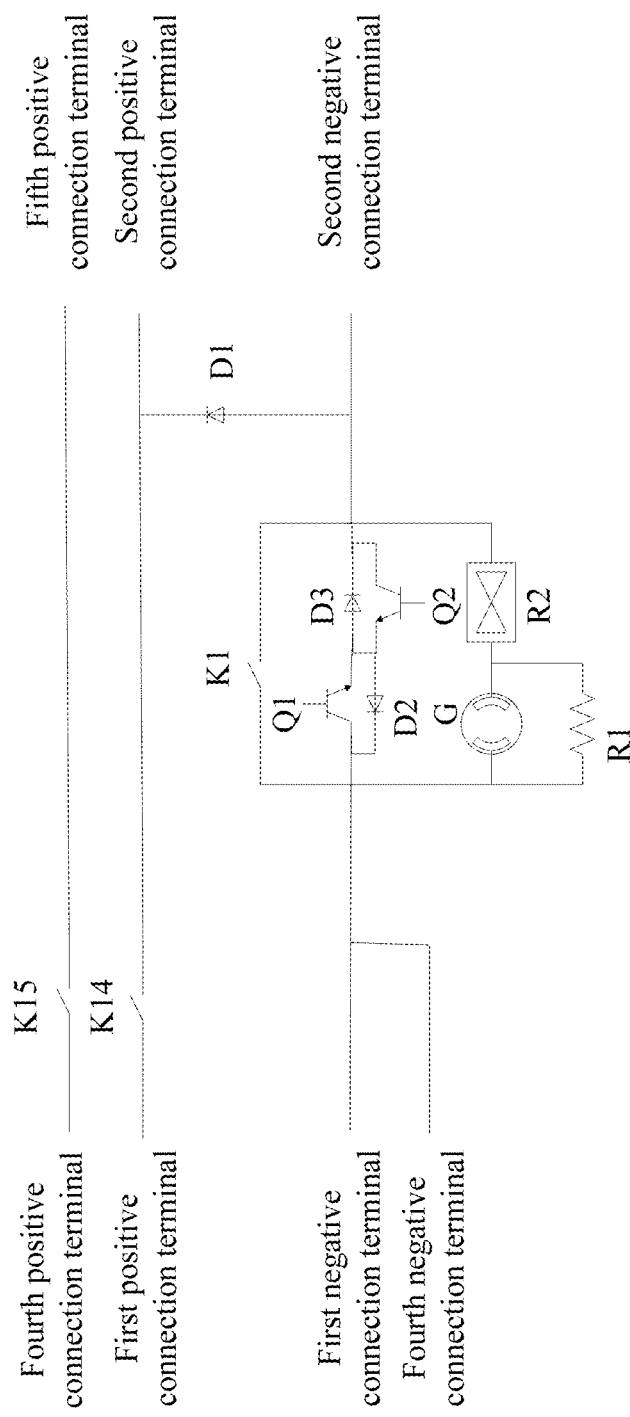
FIG. 20 is a schematic diagram of another embodiment of a photovoltaic direct-current breaking apparatus according to an embodiment of this application.

In some embodiments, based on the embodiment corresponding to FIG. 4, as shown in FIG. 20, in another embodiment of the photovoltaic direct-current breaking apparatus provided in the embodiments of this application, the photovoltaic direct-current breaking apparatus includes a fourth positive connection terminal, a fourth negative connection terminal, a fifth positive connection terminal, a fourteenth switch K14, and a fifteenth switch K15. The fourth positive connection terminal and the fourth negative connection terminal are configured to connect an input terminal of a third photovoltaic string; and the fifth positive connection terminal is configured to connect the photovoltaic energy converter. When the first switch K1, the convector circuit 10 and the energy absorption circuit 20 are connected in parallel, and are connected between the first negative connection terminal and a connection point of the second negative connection terminal and the anode of the first diode D1, the fourth negative connection terminal is connected to one end of the first switch K1, the cathode of the second diode D2, and one end of the gas discharge tube G; the fourteenth switch K14 is connected between the first positive connection terminal and a connection point of the second positive connection terminal and the cathode of the first diode D1; and the fifteenth switch K15 is connected between the fourth positive connection terminal and the fifth positive connection terminal.

In this embodiment of this application, the fifth positive connection terminal is not connected to the second positive connection terminal in the photovoltaic direct-current breaking apparatus, but in the photovoltaic energy converter, the fifth positive connection terminal may be connected to the second positive connection terminal through a circuit in the photovoltaic energy converter, so that a wire between the fourth positive connection terminal and the fifth positive connection terminal can also effectively utilize the first diode D1, the convector circuit 10, and the energy absorption circuit 20.

In this embodiment of this application, regardless of controlling a direct-current circuit between the first photovoltaic string and the photovoltaic energy converter or controlling a direct-current circuit between the third photovoltaic string and the photovoltaic energy converter, the fourteenth switch K14 or the fifteenth switch K15 is opened after the first switch K1. In this case, the convector circuit 10 is turned off, and the energy absorption circuit 20 has a high impedance. When the fourteenth switch K14 or the fifteenth switch K15 is opened, there is no voltage or current, and therefore a switch device with low-voltage specifications may be selected as the fourteenth switch K14 or the fifteenth switch K15 to implement reliable breaking in compliance with safety regulations.

Actually, based on the solution described in FIG. 20, the photovoltaic direct-current breaking apparatus may include a fourth diode, where a cathode of the fourth diode is connected between the fifteenth switch K15 and the fifth positive connection terminal; and an anode of the fourth diode is connected between the second negative connection terminal and the parallel circuit of the first switch, the convector circuit 10, and the energy absorption circuit 20.

Figure 21:
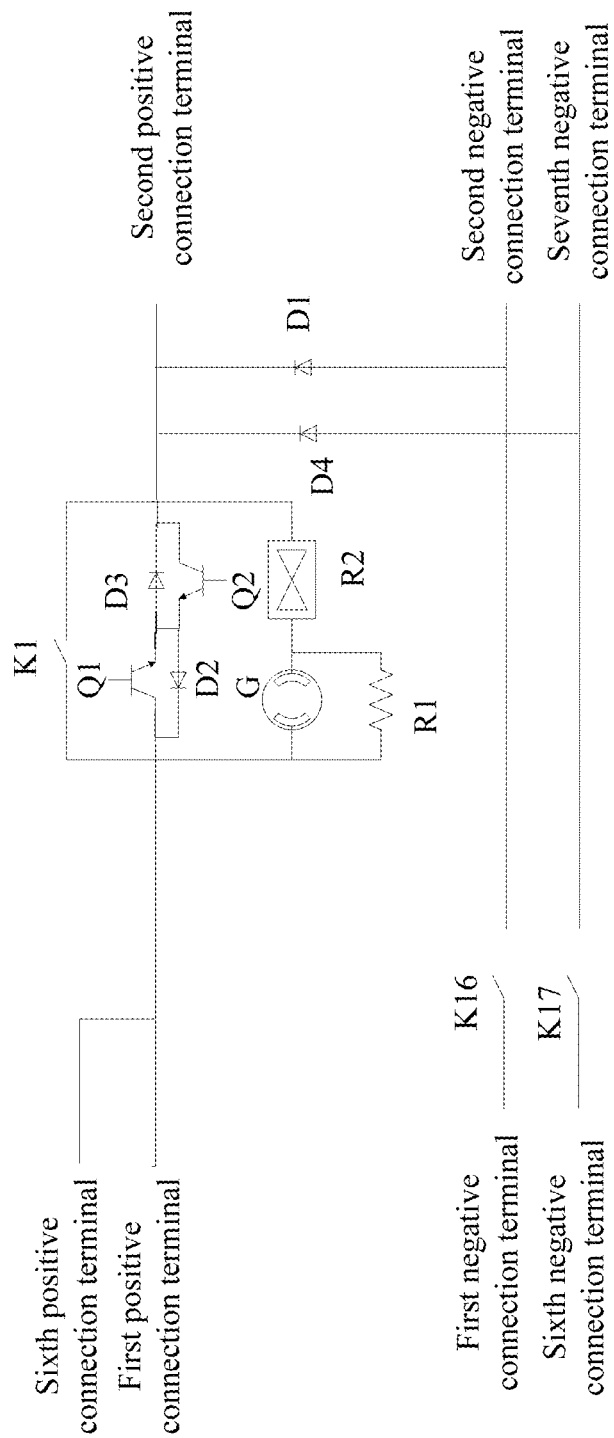
FIG. 21 is a schematic diagram of another embodiment of a photovoltaic direct-current breaking apparatus according to an embodiment of this application.

In some embodiments, based on the embodiment corresponding to FIG. 5, as shown in FIG. 21, in another embodiment of the photovoltaic direct-current breaking apparatus provided in the embodiments of this application, the photovoltaic direct-current breaking apparatus includes a sixth positive connection terminal, a sixth negative connection terminal, a seventh negative connection terminal, a fourth diode D4, a sixteenth switch K16, and a seventeenth switch K17. The sixth positive connection terminal and the sixth negative connection terminal are configured to connect an input terminal of a fourth photovoltaic string; the seventh negative connection terminal is configured to connect the photovoltaic energy converter; a cathode of the fourth diode D4 is connected between the second positive connection terminal and the parallel circuit of the first switch K1, the convector circuit 10 and the energy absorption circuit 20; and an anode of the fourth diode D4 is connected between one end of the seventeenth switch K17 and the seventh negative connection terminal. When the first switch K1, the convector circuit 10 and the energy absorption circuit 20 are connected in parallel, and are connected between the first positive connection terminal and the second positive connection terminal, the sixth positive connection terminal is connected to one end of the first switch K1, the cathode of the second diode D2, and one end of the gas discharge tube G; the sixteenth switch K16 is connected between the first negative connection terminal and a connection point of the second negative connection terminal and the anode of the first diode D1; and the seventeenth switch K17 is connected between the sixth negative connection terminal and a connection point of the seventh negative connection terminal and the anode of the fourth diode.

In this embodiment of this application, the fourth diode D2 is introduced, so that a direct-current circuit between the sixth negative connection terminal and the seventh negative connection terminal can also directly use the first switch K1, the convector circuit 10, and the energy absorption circuit 20 inside the photovoltaic direct-current breaking apparatus. Therefore, a direct-current circuit between the fourth photovoltaic string and the photovoltaic energy converter that are connected to the sixth positive connection terminal, the sixth negative connection terminal, and the seventh negative connection terminal can be safely and reliably broken off In this embodiment of this application, regardless of controlling a direct-current circuit between the first photovoltaic string and the photovoltaic energy converter or controlling a direct-current circuit between the fourth photovoltaic string and the photovoltaic energy converter, the sixteenth switch K16 or the seventeenth switch K17 is opened after the first switch K1. In this case, the convector circuit 10 is turned off, and the energy absorption circuit 20 has a high impedance. When the sixteenth switch K16 or the seventeenth switch K17 is opened, there is no voltage or current, and therefore a switch device with low-voltage specifications may be selected as the sixteenth switch K16 or the seventeenth switch K17 to implement reliable breaking in compliance with safety regulations.

The foregoing lists the possible embodiments of a plurality of different situations of the photovoltaic direct-current breaking apparatus in the embodiments of this application, but actually, the solutions that can be included in this application are not limited to the foregoing embodiments, and other circuit vibrations based on the principle of this application also fall within the protection scope of this application.

In some embodiments, the first switch K1 to the seventeenth switch K17 are used. Actually, these switches may be the same type of switches or different types of switches, and these switches may be any one or a combination of a relay, a circuit breaker, a contactor, an electromagnetic type mechanical switch.

The gas discharge tube G may be replaced by a transient suppression diode.

The first diode D1 to the fourth diode D4 may be the same type of diodes or different types of diodes.

In addition, it should be noted that the first positive connection terminal and the first negative connection terminal to the sixth positive connection terminal and the seventh negative connection terminal, the first switch K1 to the seventeenth switch K17, the first diode D1 to the fourth diode D4, the first fully-controlled semiconductor device Q1, and the second fully-controlled semiconductor device Q2 are only intended to distinguish between similar objects but do not necessarily indicate a specific order or sequence.

The photovoltaic direct current breaking apparatus provided in the embodiments of this application are described in detail above. The principle and implementation of this application are described herein through specific examples. The description about the embodiments of this application is merely provided to help understand the method and core ideas of this application. In addition, persons of ordinary skill in the art may make variations and modifications to this application in terms of the specific implementations and application scopes according to the ideas of this application. Therefore, the content of specification shall not be construed as a limit to this application.

What is claimed is:

1. A photovoltaic direct-current breaking apparatus, comprising:
   a first positive connection terminal, a first negative connection terminal, a second positive connection terminal, a second negative connection terminal, a first switch, a first diode, a convector circuit, and an energy absorption circuit; wherein
   the first positive connection terminal and the first negative connection terminal are configured to connect an output terminal of a first photovoltaic string, and the second positive connection terminal and the second negative connection terminal are configured to connect a photovoltaic energy converter;
   the first switch, the convector circuit, and the energy absorption circuit are connected in parallel, and are connected between the first negative connection terminal and the second negative connection terminal, a cathode of the first diode is connected between the first positive connection terminal and the second positive connection terminal, and an anode of the first diode is connected between the second negative connection terminal and a parallel circuit of the first switch, the convector circuit, and the energy absorption circuit; or the first switch, the convector circuit, and the energy absorption circuit are connected in parallel between the first positive connection terminal and the second positive connection terminal, a cathode of the first diode is connected between the second positive connection terminal and a parallel circuit of the first switch, the convector circuit, and the energy absorption circuit, and an anode of the first diode is connected between the first negative connection terminal and the second negative connection terminal; and
   the convector circuit comprises a first fully-controlled semiconductor device, a second fully-controlled semiconductor device, a second diode, and a third diode, wherein a cathode of the second diode is connected to an input terminal of the first fully-controlled semiconductor device, an anode of the second diode is connected to an output terminal of the first fully-controlled semiconductor device and an output terminal of the second fully-controlled semiconductor device, an anode of the third diode is connected to the output terminal of the second fully-controlled semiconductor device, and a cathode of the third diode is connected to an input terminal of the second fully-controlled semiconductor device,
   wherein the energy absorption circuit comprises a gas discharge tube, a varistor, and a steady-state balance resistor, and
   wherein the gas discharge tube is connected in parallel to the steady-state balance resistor, and connected in series to the varistor.

2. The photovoltaic direct-current breaking apparatus of claim 1, wherein the photovoltaic direct-current breaking apparatus further comprises a second switch;
   when the first switch, the convector circuit, and the energy absorption circuit are connected in parallel, and are connected between the first negative connection terminal and the second negative connection terminal, one end of the second switch is connected to the first negative connection terminal, and the other end of the second switch is connected to one end of the first switch, the cathode of the second diode, and one end of the gas discharge tube, or one end of the second switch is connected to the second negative connection terminal and the anode of the first diode, and the other end of the second switch is connected to one end of the first switch, the cathode of the third diode, and one end of the varistor.

3. The photovoltaic direct-current breaking apparatus of claim 1, wherein the photovoltaic direct-current breaking apparatus further comprises a third switch; and
   the third switch is connected between the first positive connection terminal and a connection point of the second positive connection terminal and the cathode of the first diode.

4. The photovoltaic direct-current breaking apparatus of claim 1, wherein the photovoltaic direct-current breaking apparatus further comprises a fourth switch;
   when the first switch, the convector circuit, and the energy absorption circuit are connected in parallel, and are connected between the first positive connection terminal and the second positive connection terminal, one end of the fourth switch is connected to the first positive connection terminal, and the other end of the fourth switch is connected to one end of the first switch, the cathode of the second diode, and one end of the gas discharge tube, or one end of the fourth switch is connected to the second positive connection terminal and the cathode of the first diode, and the other end of the fourth switch is connected to one end of the first switch, the cathode of the third diode, and one end of the varistor.

5. The photovoltaic direct-current breaking apparatus of claim 1, wherein the photovoltaic direct-current breaking apparatus further comprises a fifth switch; and
   the fifth switch is connected between the first negative connection terminal and a connection point of the second negative connection terminal and the anode of the first diode.

6. The photovoltaic direct-current breaking apparatus of claim 1, wherein the photovoltaic direct-current breaking apparatus further comprises a third positive connection terminal and a third negative connection terminal; and
   the third negative connection terminal is connected between the first negative connection terminal and the parallel circuit of the first switch, the convector circuit, and the energy absorption circuit, the third positive connection terminal is connected between the first positive connection terminal and a connection point of the second positive connection terminal and the cathode of the first diode, and the third positive connection terminal and the third negative connection terminal are configured to connect an input terminal of a second photovoltaic string.

7. The photovoltaic direct-current breaking apparatus of claim 6, wherein the photovoltaic direct-current breaking apparatus further comprises a sixth switch and a seventh switch;
one end of the sixth switch is connected to the first negative connection terminal, and the other end of the sixth switch is connected to one end of the first switch, the cathode of the second diode, and one end of the gas discharge tube; and
one end of the seventh switch is connected to the third negative connection terminal, and the other end of the seventh switch is connected to one end of the first switch, the cathode of the second diode, and one end of the gas discharge tube.

8. The photovoltaic direct-current breaking apparatus of claim 6, wherein the photovoltaic direct-current breaking apparatus further comprises an eighth switch and a ninth switch;
the eighth switch is connected between the first positive connection terminal and the connection point of the second positive connection terminal and the cathode of the first diode; and
one end of the ninth switch is connected to the third positive connection terminal, and the other end of the ninth switch is connected to the third positive connection terminal and the connection point of the second positive connection terminal and the cathode of the first diode.

9. The photovoltaic direct-current breaking apparatus of claim 6, wherein the photovoltaic direct-current breaking apparatus further comprises a tenth switch and an eleventh switch;
one end of the tenth switch is connected to the first positive connection terminal, and the other end of the tenth switch is connected to one end of the first switch, the cathode of the second diode, and one end of the gas discharge tube; and
one end of the eleventh switch is connected to the third positive connection terminal, and the other end of the eleventh switch is connected to one end of the first switch, the cathode of the second diode, and one end of the gas discharge tube.

10. The photovoltaic direct-current breaking apparatus of claim 6, wherein the photovoltaic direct-current breaking apparatus further comprises a twelfth switch and a thirteenth switch;
the twelfth switch is connected between the first negative connection terminal and a connection point of the second negative connection terminal and the cathode of the first diode; and
one end of the thirteenth switch is connected to the third negative connection terminal, and the other end of the thirteenth switch is connected between the third negative connection terminal and a connection point of the second negative connection terminal and the anode of the first diode.

11. The photovoltaic direct-current breaking apparatus of claim 1, wherein the photovoltaic direct-current breaking apparatus further comprises a fourth positive connection terminal, a fourth negative connection terminal, a fifth positive connection terminal, a fourteenth switch, and a fifteenth switch, wherein the fourth positive connection terminal and the fourth negative connection terminal are configured to connect an input terminal of a third photovoltaic string, and the fifth positive connection terminal is configured to connect the photovoltaic energy converter, and
wherein, when the first switch, the convector circuit, and the energy absorption circuit are connected in parallel, and are connected between the first negative connection terminal and a connection point of the second negative connection terminal and the anode of the first diode, the fourth negative connection terminal is connected to one end of the first switch, the cathode of the second diode, and one end of the gas discharge tube; the fourteenth switch is connected between the first positive connection terminal and a connection point of the second positive connection terminal and the cathode of the first diode; and the fifteenth switch is connected between the fourth positive connection terminal and the fifth positive connection terminal.

12. The photovoltaic direct-current breaking apparatus of claim 11, wherein the photovoltaic direct-current breaking apparatus further comprises a fourth diode; a cathode of the fourth diode is connected between the fifteenth switch and the fifth positive connection terminal; and an anode of the fourth diode is connected between the second negative connection terminal and the parallel circuit of the first switch, the convector circuit, and the energy absorption circuit.

13. The photovoltaic direct-current breaking apparatus of claim 1, wherein the photovoltaic direct-current breaking apparatus further comprises a sixth positive connection terminal, a sixth negative connection terminal, a seventh negative connection terminal, a fourth diode, a sixteenth switch, and a seventeenth switch; the sixth positive connection terminal and the sixth negative connection terminal are configured to connect an input terminal of a fourth photovoltaic string, the seventh negative connection terminal is configured to connect the photovoltaic energy converter, a cathode of the fourth diode is connected between the second positive connection terminal and the parallel circuit of the first switch, the convector circuit, and the energy absorption circuit, and an anode of the fourth diode is connected between one end of the seventeenth switch and the seventh negative connection terminal, and
wherein, when the first switch, the convector circuit, and the energy absorption circuit are connected in parallel, and are connected between the first positive connection terminal and the second positive connection terminal, the sixth positive connection terminal is connected to one end of the first switch, the cathode of the second diode, and one end of the gas discharge tube, the sixteenth switch is connected between the first negative connection terminal and a connection point of the second negative connection terminal and the anode of the first diode, and the seventeenth switch is connected between the sixth negative connection terminal and a connection point of the seventh negative connection terminal and the anode of the fourth diode.

* * * * *